(12) United States Patent
Metzmaker et al.

(10) Patent No.: US 12,495,994 B2
(45) Date of Patent: Dec. 16, 2025

(54) MEAL BOLUS SUBCATEGORIES IN MODEL BASED INSULIN THERAPY

(71) Applicant: Insulet Corporation, Acton, MA (US)

(72) Inventors: Thomas Metzmaker, Harvard, MA (US); Nicholas Conte, Harvard, MA (US); Ian McLaughlin, Groton, MA (US); Joon Bok Lee, Acton, MA (US); Paul Frederick Bente, IV, Westford, MA (US); Ashutosh Zade, San Diego, CA (US); Steven Cardinali, Tewksbury, MA (US)

(73) Assignee: INSULET CORPORATION, Acton, MA (US)

( * ) Notice: Subject to any disclaimer, the term of this patent is extended or adjusted under 35 U.S.C. 154(b) by 423 days.

(21) Appl. No.: 16/796,575

(22) Filed: Feb. 20, 2020

(65) Prior Publication Data

US 2021/0259590 A1   Aug. 26, 2021

(51) Int. Cl.
*A61B 5/145*     (2006.01)
*A61B 5/00*      (2006.01)
(Continued)

(52) U.S. Cl.
CPC ........ *A61B 5/14532* (2013.01); *A61B 5/4839* (2013.01); *G16H 20/60* (2018.01);
(Continued)

(58) Field of Classification Search
CPC ... A61B 5/14532; A61B 5/425; A61B 5/4839; G16H 40/67; G16H 40/63; G16H 20/60; G16H 20/17; G16H 50/20
See application file for complete search history.

(56) References Cited

U.S. PATENT DOCUMENTS 303,013 A    8/1884 Horton
2,797,149 A  6/1957 Skeggs
(Continued)

FOREIGN PATENT DOCUMENTS

AU    2015200834 A1    3/2015
AU    2015301146 A1    3/2017
(Continued)

OTHER PUBLICATIONS

US 5,954,699 A, 09/1999, Jost et al. (withdrawn)
(Continued)

*Primary Examiner* — Matthew Kremer
*Assistant Examiner* — Meghan R Kumar
(74) *Attorney, Agent, or Firm* — GOODWIN PROCTER LLP

(57) ABSTRACT

Disclosed are examples that include receiving information related to ingestion of a meal. The information may include a coarse indication of a size of the meal, a relative time of ingestion of the meal, and a general composition indication of the meal. A blood glucose measurement value received within a predetermined time range of a relative time of ingestion of the meal may be identified. Settings for a delay and an extend parameter and a delivery constraint may be determined. A meal model may be modified using the determined settings for the delay parameter, the extend parameter, and the delivery constraint. The modified meal model may be used to determine a dose of insulin to be delivered in response to the received information. An instruction indicates a determined dose of insulin to be delivered may be output for delivery to a drug delivery device.

13 Claims, 5 Drawing Sheets

(51) Int. Cl.
  *G16H 20/60* (2018.01)
  *G16H 40/63* (2018.01)
  *G16H 40/67* (2018.01)
(52) U.S. Cl.
  CPC .............. *G16H 40/63* (2018.01); *G16H 40/67* (2018.01); *A61B 5/425* (2013.01)

(56) References Cited

U.S. PATENT DOCUMENTS

| | | |
|---|---|---|
| 3,631,847 A | 1/1972 | Hobbs |
| 3,634,039 A | 1/1972 | Brondy |
| 3,812,843 A | 5/1974 | Wootten et al. |
| 3,841,328 A | 10/1974 | Jensen |
| 3,963,380 A | 6/1976 | Thomas, Jr. et al. |
| 4,055,175 A | 10/1977 | Clemens et al. |
| 4,146,029 A | 3/1979 | Ellinwood, Jr. |
| 4,151,845 A | 5/1979 | Clemens |
| 4,245,634 A | 1/1981 | Albisser et al. |
| 4,368,980 A | 1/1983 | Aldred et al. |
| 4,373,527 A | 2/1983 | Fischell |
| 4,403,984 A | 9/1983 | Ash et al. |
| 4,464,170 A | 8/1984 | Clemens et al. |
| 4,469,481 A | 9/1984 | Kobayashi |
| 4,475,901 A | 10/1984 | Kraegen et al. |
| 4,526,568 A | 7/1985 | Clemens et al. |
| 4,526,569 A | 7/1985 | Bernardi |
| 4,529,401 A | 7/1985 | Leslie et al. |
| 4,559,033 A | 12/1985 | Stephen et al. |
| 4,559,037 A | 12/1985 | Franetzki et al. |
| 4,573,968 A | 3/1986 | Parker |
| 4,624,661 A | 11/1986 | Arimond |
| 4,633,878 A | 1/1987 | Bombardieri |
| 4,657,529 A | 4/1987 | Prince et al. |
| 4,685,903 A | 8/1987 | Cable et al. |
| 4,731,726 A | 3/1988 | Allen, III |
| 4,743,243 A | 5/1988 | Vaillancourt |
| 4,755,173 A | 7/1988 | Konopka et al. |
| 4,781,688 A | 11/1988 | Thoma et al. |
| 4,781,693 A | 11/1988 | Martinez et al. |
| 4,808,161 A | 2/1989 | Kamen |
| 4,854,170 A | 8/1989 | Brimhall et al. |
| 4,886,499 A | 12/1989 | Cirelli et al. |
| 4,900,292 A | 2/1990 | Berry et al. |
| 4,919,596 A | 4/1990 | Slate et al. |
| 4,925,444 A | 5/1990 | Orkin et al. |
| 4,940,527 A | 7/1990 | Kazlauskas et al. |
| 4,975,581 A | 12/1990 | Robinson et al. |
| 4,976,720 A | 12/1990 | Machold et al. |
| 4,981,140 A | 1/1991 | Wyatt |
| 4,994,047 A | 2/1991 | Walker et al. |
| 5,007,286 A | 4/1991 | Malcolm et al. |
| 5,097,834 A | 3/1992 | Skrabal |
| 5,102,406 A | 4/1992 | Arnold |
| 5,109,850 A | 5/1992 | Blanco et al. |
| 5,125,415 A | 6/1992 | Bell |
| 5,134,079 A | 7/1992 | Cusack et al. |
| 5,153,827 A | 10/1992 | Coutre et al. |
| 5,165,406 A | 11/1992 | Wong |
| 5,176,662 A | 1/1993 | Bartholomew et al. |
| 5,178,609 A | 1/1993 | Ishikawa |
| 5,207,642 A | 5/1993 | Orkin et al. |
| 5,232,439 A | 8/1993 | Campbell et al. |
| 5,237,993 A | 8/1993 | Skrabal |
| 5,244,463 A | 9/1993 | Cordner, Jr. et al. |
| 5,257,980 A | 11/1993 | Van Antwerp et al. |
| 5,273,517 A | 12/1993 | Barone et al. |
| 5,281,808 A | 1/1994 | Kunkel |
| 5,299,571 A | 4/1994 | Mastrototaro |
| 5,308,982 A | 5/1994 | Ivaldi et al. |
| 5,342,298 A | 8/1994 | Michaels et al. |
| 5,377,674 A | 1/1995 | Kuestner |
| 5,380,665 A | 1/1995 | Cusack et al. |
| 5,385,539 A | 1/1995 | Maynard |
| 5,389,078 A | 2/1995 | Zalesky |
| 5,411,889 A | 5/1995 | Hoots et al. |
| 5,421,812 A | 6/1995 | Langley et al. |
| 5,468,727 A | 11/1995 | Phillips et al. |
| 5,505,709 A | 4/1996 | Funderburk et al. |
| 5,505,828 A | 4/1996 | Wong et al. |
| 5,507,288 A | 4/1996 | Bocker et al. |
| 5,533,389 A | 7/1996 | Kamen et al. |
| 5,558,640 A | 9/1996 | Pfeiler et al. |
| 5,569,186 A | 10/1996 | Lord et al. |
| 5,584,813 A | 12/1996 | Livingston et al. |
| 5,609,572 A | 3/1997 | Ang |
| 5,665,065 A | 9/1997 | Colman et al. |
| 5,678,539 A | 10/1997 | Schubert et al. |
| 5,685,844 A | 11/1997 | Marttila |
| 5,685,859 A | 11/1997 | Kornerup |
| 5,693,018 A | 12/1997 | Kriesel et al. |
| 5,697,899 A | 12/1997 | Hillman et al. |
| 5,700,695 A | 12/1997 | Yassinzadeh et al. |
| 5,703,364 A | 12/1997 | Rosenthal |
| 5,714,123 A | 2/1998 | Sohrab |
| 5,716,343 A | 2/1998 | Kriesel et al. |
| 5,722,397 A | 3/1998 | Eppstein |
| 5,741,228 A | 4/1998 | Lambrecht et al. |
| 5,746,217 A | 5/1998 | Erickson et al. |
| 5,755,682 A | 5/1998 | Knudson et al. |
| 5,758,643 A | 6/1998 | Wong et al. |
| 5,800,405 A | 9/1998 | McPhee |
| 5,800,420 A | 9/1998 | Gross et al. |
| 5,801,057 A | 9/1998 | Smart et al. |
| 5,804,048 A | 9/1998 | Wong et al. |
| 5,817,007 A | 10/1998 | Fodgaard et al. |
| 5,820,622 A | 10/1998 | Gross et al. |
| 5,823,951 A | 10/1998 | Messerschmidt |
| 5,840,020 A | 11/1998 | Heinonen et al. |
| 5,848,991 A | 12/1998 | Gross et al. |
| 5,851,197 A | 12/1998 | Marano et al. |
| 5,858,005 A | 1/1999 | Kriesel |
| 5,865,806 A | 2/1999 | Howell |
| 5,871,470 A | 2/1999 | McWha |
| 5,879,310 A | 3/1999 | Sopp et al. |
| 5,902,253 A | 5/1999 | Pfeiffer et al. |
| 5,931,814 A | 8/1999 | Alex et al. |
| 5,932,175 A | 8/1999 | Knute et al. |
| 5,935,099 A | 8/1999 | Peterson et al. |
| 5,947,911 A | 9/1999 | Wong et al. |
| 5,971,941 A | 10/1999 | Simons et al. |
| 5,993,423 A | 11/1999 | Choi |
| 5,997,501 A | 12/1999 | Gross et al. |
| 6,017,318 A | 1/2000 | Gauthier et al. |
| 6,024,539 A | 2/2000 | Blomquist |
| 6,032,059 A | 2/2000 | Henning et al. |
| 6,036,924 A | 3/2000 | Simons et al. |
| 6,040,578 A | 3/2000 | Malin et al. |
| 6,049,727 A | 4/2000 | Crothall |
| 6,050,978 A | 4/2000 | Orr et al. |
| 6,058,934 A | 5/2000 | Sullivan |
| 6,066,103 A | 5/2000 | Duchon et al. |
| 6,071,292 A | 6/2000 | Makower et al. |
| 6,072,180 A | 6/2000 | Kramer et al. |
| 6,077,055 A | 6/2000 | Vilks |
| 6,090,092 A | 7/2000 | Fowles et al. |
| 6,101,406 A | 8/2000 | Hacker et al. |
| 6,102,872 A | 8/2000 | Doneen et al. |
| 6,115,673 A | 9/2000 | Malin et al. |
| 6,123,827 A | 9/2000 | Wong et al. |
| 6,124,134 A | 9/2000 | Stark |
| 6,126,637 A | 10/2000 | Kriesel et al. |
| 6,128,519 A | 10/2000 | Say |
| 6,142,939 A | 11/2000 | Eppstein et al. |
| 6,143,164 A | 11/2000 | Heller et al. |
| 6,157,041 A | 12/2000 | Thomas et al. |
| 6,161,028 A | 12/2000 | Braig et al. |
| 6,162,639 A | 12/2000 | Douglas |
| 6,196,046 B1 | 3/2001 | Braig et al. |
| 6,200,287 B1 | 3/2001 | Keller et al. |
| 6,200,338 B1 | 3/2001 | Solomon et al. |
| 6,214,629 B1 | 4/2001 | Freitag et al. |
| 6,226,082 B1 | 5/2001 | Roe |
| 6,244,776 B1 | 6/2001 | Wiley |
| 6,261,065 B1 | 7/2001 | Nayak et al. |

(56) References Cited

U.S. PATENT DOCUMENTS

| | | |
|---|---|---|
| 6,262,798 B1 | 7/2001 | Shepherd et al. |
| 6,270,455 B1 | 8/2001 | Brown |
| 6,271,045 B1 | 8/2001 | Douglas et al. |
| 6,280,381 B1 | 8/2001 | Malin et al. |
| 6,285,448 B1 | 9/2001 | Kunstner |
| 6,309,370 B1 | 10/2001 | Haim et al. |
| 6,312,888 B1 | 11/2001 | Wong et al. |
| 6,334,851 B1 | 1/2002 | Hayes et al. |
| 6,375,627 B1 | 4/2002 | Mauze et al. |
| 6,379,301 B1 | 4/2002 | Worthington et al. |
| 6,402,689 B1 | 6/2002 | Scarantino et al. |
| 6,470,279 B1 | 10/2002 | Samsoondar |
| 6,475,196 B1 | 11/2002 | Vachon |
| 6,477,901 B1 | 11/2002 | Tadigadapa et al. |
| 6,484,044 B1 | 11/2002 | Lilienfeld-Toal |
| 6,491,656 B1 | 12/2002 | Morris |
| 6,512,937 B2 | 1/2003 | Blank et al. |
| 6,525,509 B1 | 2/2003 | Petersson et al. |
| 6,528,809 B1 | 3/2003 | Thomas et al. |
| 6,540,672 B1 | 4/2003 | Simonsen et al. |
| 6,544,212 B2 | 4/2003 | Galley et al. |
| 6,546,268 B1 | 4/2003 | Ishikawa et al. |
| 6,546,269 B1 | 4/2003 | Kurnik |
| 6,553,841 B1 | 4/2003 | Blouch |
| 6,554,798 B1 | 4/2003 | Mann et al. |
| 6,556,850 B1 | 4/2003 | Braig et al. |
| 6,558,351 B1 | 5/2003 | Steil et al. |
| 6,560,471 B1 | 5/2003 | Heller et al. |
| 6,561,978 B1 | 5/2003 | Conn et al. |
| 6,562,001 B2 | 5/2003 | Lebel et al. |
| 6,562,014 B2 | 5/2003 | Lin et al. |
| 6,569,125 B2 | 5/2003 | Jepson et al. |
| 6,572,542 B1 | 6/2003 | Houben et al. |
| 6,572,545 B2 | 6/2003 | Knobbe et al. |
| 6,574,490 B2 | 6/2003 | Abbink et al. |
| 6,575,905 B2 | 6/2003 | Knobbe et al. |
| 6,580,934 B1 | 6/2003 | Braig et al. |
| 6,618,603 B2 | 9/2003 | Varalli et al. |
| 6,633,772 B2 | 10/2003 | Ford et al. |
| 6,645,142 B2 | 11/2003 | Braig et al. |
| 6,653,091 B1 | 11/2003 | Dunn et al. |
| 6,662,030 B2 | 12/2003 | Khalil et al. |
| 6,669,663 B1 | 12/2003 | Thompson |
| 6,678,542 B2 | 1/2004 | Braig et al. |
| 6,699,221 B2 | 3/2004 | Vaillancourt |
| 6,718,189 B2 | 4/2004 | Rohrscheib et al. |
| 6,721,582 B2 | 4/2004 | Trepagnier et al. |
| 6,728,560 B2 | 4/2004 | Kollias et al. |
| 6,740,059 B2 | 5/2004 | Flaherty |
| 6,740,072 B2 | 5/2004 | Starkweather et al. |
| 6,751,490 B2 | 6/2004 | Esenaliev et al. |
| 6,758,835 B2 | 7/2004 | Close et al. |
| 6,780,156 B2 | 8/2004 | Haueter et al. |
| 6,810,290 B2 | 10/2004 | Lebel et al. |
| 6,837,858 B2 | 1/2005 | Cunningham et al. |
| 6,837,988 B2 | 1/2005 | Eong et al. |
| 6,846,288 B2 | 1/2005 | Nagar et al. |
| 6,862,534 B2 | 3/2005 | Sterling et al. |
| 6,865,408 B1 | 3/2005 | Abbink et al. |
| 6,890,291 B2 | 5/2005 | Robinson et al. |
| 6,936,029 B2 | 8/2005 | Mann et al. |
| 6,949,081 B1 | 9/2005 | Chance |
| 6,958,809 B2 | 10/2005 | Sterling et al. |
| 6,989,891 B2 | 1/2006 | Braig et al. |
| 6,990,366 B2 | 1/2006 | Say et al. |
| 7,008,404 B2 | 3/2006 | Nakajima |
| 7,009,180 B2 | 3/2006 | Sterling et al. |
| 7,016,713 B2 | 3/2006 | Gardner et al. |
| 7,018,360 B2 | 3/2006 | Flaherty et al. |
| 7,025,743 B2 | 4/2006 | Mann et al. |
| 7,025,744 B2 | 4/2006 | Utterberg et al. |
| 7,027,848 B2 | 4/2006 | Robinson et al. |
| 7,043,288 B2 | 5/2006 | Davis, III et al. |
| 7,060,059 B2 | 6/2006 | Keith et al. |
| 7,061,593 B2 | 6/2006 | Braig et al. |
| 7,096,124 B2 | 8/2006 | Sterling et al. |
| 7,115,205 B2 | 10/2006 | Robinson et al. |
| 7,128,727 B2 | 10/2006 | Flaherty et al. |
| 7,139,593 B2 | 11/2006 | Kavak et al. |
| 7,139,598 B2 | 11/2006 | Hull et al. |
| 7,144,384 B2 | 12/2006 | Gorman et al. |
| 7,171,252 B1 | 1/2007 | Scarantino et al. |
| 7,190,988 B2 | 3/2007 | Say et al. |
| 7,204,823 B2 | 4/2007 | Estes et al. |
| 7,248,912 B2 | 7/2007 | Gough et al. |
| 7,267,665 B2 | 9/2007 | Steil et al. |
| 7,271,912 B2 | 9/2007 | Sterling et al. |
| 7,278,983 B2 | 10/2007 | Ireland et al. |
| 7,291,107 B2 | 11/2007 | Hellwig et al. |
| 7,291,497 B2 | 11/2007 | Holmes et al. |
| 7,303,549 B2 | 12/2007 | Flaherty et al. |
| 7,303,622 B2 | 12/2007 | Loch et al. |
| 7,303,922 B2 | 12/2007 | Jeng et al. |
| 7,354,420 B2 | 4/2008 | Steil et al. |
| 7,388,202 B2 | 6/2008 | Sterling et al. |
| 7,402,153 B2 | 7/2008 | Steil et al. |
| 7,404,796 B2 | 7/2008 | Ginsberg |
| 7,429,255 B2 | 9/2008 | Thompson |
| 7,460,130 B2 | 12/2008 | Salganicoff |
| 7,481,787 B2 | 1/2009 | Gable et al. |
| 7,491,187 B2 | 2/2009 | Van Den Berghe et al. |
| 7,500,949 B2 | 3/2009 | Gottlieb et al. |
| 7,509,156 B2 | 3/2009 | Flanders |
| 7,547,281 B2 | 6/2009 | Hayes et al. |
| 7,569,030 B2 | 8/2009 | Ebel et al. |
| 7,608,042 B2 | 10/2009 | Goldberger et al. |
| 7,651,845 B2 | 1/2010 | Doyle, III et al. |
| 7,680,529 B2 | 3/2010 | Kroll |
| 7,734,323 B2 | 6/2010 | Blomquist et al. |
| 7,766,829 B2 | 8/2010 | Sloan et al. |
| 7,785,258 B2 | 8/2010 | Braig et al. |
| 7,806,854 B2 | 10/2010 | Damiano et al. |
| 7,806,886 B2 | 10/2010 | Kanderian, Jr. et al. |
| 7,918,825 B2 | 4/2011 | OConnor et al. |
| 7,946,985 B2 | 5/2011 | Mastrototaro et al. |
| 7,972,296 B2 | 7/2011 | Braig et al. |
| 8,221,345 B2 | 7/2012 | Blomquist |
| 8,251,907 B2 | 8/2012 | Sterling et al. |
| 8,449,524 B2 | 5/2013 | Braig et al. |
| 8,452,359 B2 | 5/2013 | Rebec et al. |
| 8,454,576 B2 | 6/2013 | Mastrototaro et al. |
| 8,467,980 B2 | 6/2013 | Campbell et al. |
| 8,478,557 B2 | 7/2013 | Hayter et al. |
| 8,547,239 B2 | 10/2013 | Peatfield et al. |
| 8,597,274 B2 | 12/2013 | Sloan et al. |
| 8,622,988 B2 | 1/2014 | Hayter |
| 8,810,394 B2 | 8/2014 | Kalpin |
| 9,061,097 B2 | 6/2015 | Holt et al. |
| 9,171,343 B1 | 10/2015 | Fischell et al. |
| 9,233,204 B2 | 1/2016 | Booth et al. |
| 9,486,571 B2 | 11/2016 | Rosinko et al. |
| 9,579,456 B2 | 2/2017 | Budiman et al. |
| 9,743,224 B2 | 8/2017 | San Vicente et al. |
| 9,907,515 B2 | 3/2018 | Doyle, III et al. |
| 9,980,140 B1 | 5/2018 | Spencer et al. |
| 9,984,773 B2 | 5/2018 | Gondhalekar et al. |
| 10,248,839 B2 | 4/2019 | Levy et al. |
| 10,335,464 B1 | 7/2019 | Michelich et al. |
| 10,583,250 B2 | 3/2020 | Mazlish et al. |
| 10,737,024 B2 | 8/2020 | Schmid |
| 10,987,468 B2 | 4/2021 | Mazlish et al. |
| 11,197,964 B2 | 12/2021 | Sjolund et al. |
| 11,260,169 B2 | 3/2022 | Estes |
| 2001/0021803 A1 | 9/2001 | Blank et al. |
| 2001/0034023 A1 | 10/2001 | Stanton, Jr. et al. |
| 2001/0034502 A1 | 10/2001 | Moberg et al. |
| 2001/0051377 A1 | 12/2001 | Hammer et al. |
| 2001/0053895 A1 | 12/2001 | Vaillancourt |
| 2002/0010401 A1 | 1/2002 | Bushmakin et al. |
| 2002/0010423 A1 | 1/2002 | Gross et al. |
| 2002/0016568 A1 | 2/2002 | Lebel et al. |
| 2002/0040208 A1 | 4/2002 | Flaherty et al. |
| 2002/0123740 A1 | 9/2002 | Flaherty et al. |
| 2002/0128543 A1 | 9/2002 | Leonhardt |

(56) References Cited

U.S. PATENT DOCUMENTS

| | | |
|---|---|---|
| 2002/0147423 A1 | 10/2002 | Burbank et al. |
| 2002/0155425 A1 | 10/2002 | Han et al. |
| 2002/0161288 A1 | 10/2002 | Shin et al. |
| 2003/0023148 A1 | 1/2003 | Lorenz et al. |
| 2003/0050621 A1 | 3/2003 | Ebel et al. |
| 2003/0060692 A1 | 3/2003 | Ruchti et al. |
| 2003/0086074 A1 | 5/2003 | Braig et al. |
| 2003/0086075 A1 | 5/2003 | Braig et al. |
| 2003/0090649 A1 | 5/2003 | Sterling et al. |
| 2003/0100040 A1 | 5/2003 | Bonnecaze et al. |
| 2003/0130616 A1 | 7/2003 | Steil et al. |
| 2003/0135388 A1 | 7/2003 | Martucci et al. |
| 2003/0144582 A1 | 7/2003 | Cohen et al. |
| 2003/0163097 A1 | 8/2003 | Fleury et al. |
| 2003/0195404 A1 | 10/2003 | Knobbe et al. |
| 2003/0208113 A1 | 11/2003 | Mault et al. |
| 2003/0208154 A1 | 11/2003 | Close et al. |
| 2003/0212379 A1 | 11/2003 | Bylund et al. |
| 2003/0216627 A1 | 11/2003 | Lorenz et al. |
| 2003/0220605 A1 | 11/2003 | Bowman, Jr. et al. |
| 2004/0010207 A1 | 1/2004 | Flaherty et al. |
| 2004/0034295 A1 | 2/2004 | Salganicoff |
| 2004/0045879 A1 | 3/2004 | Shults et al. |
| 2004/0051368 A1 | 3/2004 | Caputo et al. |
| 2004/0064259 A1 | 4/2004 | Haaland et al. |
| 2004/0097796 A1 | 5/2004 | Berman et al. |
| 2004/0116847 A1 | 6/2004 | Wall |
| 2004/0122353 A1 | 6/2004 | Shahmirian et al. |
| 2004/0133166 A1 | 7/2004 | Moberg et al. |
| 2004/0147034 A1 | 7/2004 | Gore et al. |
| 2004/0171983 A1 | 9/2004 | Sparks et al. |
| 2004/0203357 A1 | 10/2004 | Nassimi |
| 2004/0204868 A1 | 10/2004 | Maynard et al. |
| 2004/0215492 A1 | 10/2004 | Choi |
| 2004/0220517 A1 | 11/2004 | Starkweather et al. |
| 2004/0241736 A1 | 12/2004 | Hendee et al. |
| 2004/0249308 A1 | 12/2004 | Forssell |
| 2005/0003470 A1 | 1/2005 | Nelson et al. |
| 2005/0020980 A1 | 1/2005 | Inoue et al. |
| 2005/0022274 A1 | 1/2005 | Campbell et al. |
| 2005/0033148 A1 | 2/2005 | Haueter et al. |
| 2005/0049179 A1 | 3/2005 | Davidson et al. |
| 2005/0065464 A1 | 3/2005 | Talbot et al. |
| 2005/0065465 A1 | 3/2005 | Lebel et al. |
| 2005/0075624 A1 | 4/2005 | Miesel |
| 2005/0105095 A1 | 5/2005 | Pesach et al. |
| 2005/0137573 A1 | 6/2005 | McLaughlin |
| 2005/0171503 A1 | 8/2005 | Van Den Berghe et al. |
| 2005/0182306 A1 | 8/2005 | Sloan |
| 2005/0192494 A1 | 9/2005 | Ginsberg |
| 2005/0192557 A1 | 9/2005 | Brauker et al. |
| 2005/0197621 A1 | 9/2005 | Poulsen et al. |
| 2005/0203360 A1 | 9/2005 | Brauker et al. |
| 2005/0203461 A1 | 9/2005 | Flaherty et al. |
| 2005/0238507 A1 | 10/2005 | Dilanni et al. |
| 2005/0261660 A1 | 11/2005 | Choi |
| 2005/0272640 A1 | 12/2005 | Doyle, III et al. |
| 2005/0277912 A1 | 12/2005 | John |
| 2006/0009727 A1 | 1/2006 | OMahony et al. |
| 2006/0079809 A1 | 4/2006 | Goldberger et al. |
| 2006/0100494 A1 | 5/2006 | Kroll |
| 2006/0134323 A1 | 6/2006 | OBrien |
| 2006/0167350 A1 | 7/2006 | Monfre et al. |
| 2006/0173406 A1 | 8/2006 | Hayes et al. |
| 2006/0189925 A1 | 8/2006 | Gable et al. |
| 2006/0189926 A1 | 8/2006 | Hall et al. |
| 2006/0197015 A1 | 9/2006 | Sterling et al. |
| 2006/0200070 A1 | 9/2006 | Callicoat et al. |
| 2006/0204535 A1 | 9/2006 | Johnson |
| 2006/0229531 A1 | 10/2006 | Goldberger et al. |
| 2006/0253085 A1 | 11/2006 | Geismar et al. |
| 2006/0264895 A1 | 11/2006 | Flanders |
| 2006/0270983 A1 | 11/2006 | Lord et al. |
| 2006/0276771 A1 | 12/2006 | Galley et al. |
| 2006/0282290 A1 | 12/2006 | Flaherty et al. |
| 2007/0016127 A1 | 1/2007 | Staib et al. |
| 2007/0060796 A1 | 3/2007 | Kim |
| 2007/0060869 A1 | 3/2007 | Tolle et al. |
| 2007/0060872 A1 | 3/2007 | Hall et al. |
| 2007/0083160 A1 | 4/2007 | Hall et al. |
| 2007/0106135 A1 | 5/2007 | Sloan et al. |
| 2007/0116601 A1 | 5/2007 | Patton |
| 2007/0118405 A1 | 5/2007 | Campbell et al. |
| 2007/0129690 A1 | 6/2007 | Rosenblatt et al. |
| 2007/0142720 A1 | 6/2007 | Ridder et al. |
| 2007/0173761 A1 | 7/2007 | Kanderian et al. |
| 2007/0173974 A1 | 7/2007 | Lin |
| 2007/0179352 A1 | 8/2007 | Randlov et al. |
| 2007/0191716 A1 | 8/2007 | Goldberger et al. |
| 2007/0197163 A1 | 8/2007 | Robertson |
| 2007/0225675 A1 | 9/2007 | Robinson et al. |
| 2007/0244381 A1 | 10/2007 | Robinson et al. |
| 2007/0249007 A1 | 10/2007 | Rosero |
| 2007/0264707 A1 | 11/2007 | Liederman et al. |
| 2007/0282269 A1 | 12/2007 | Carter et al. |
| 2007/0287985 A1 | 12/2007 | Estes et al. |
| 2007/0293843 A1 | 12/2007 | Ireland et al. |
| 2008/0033272 A1 | 2/2008 | Gough et al. |
| 2008/0051764 A1 | 2/2008 | Dent et al. |
| 2008/0058625 A1 | 3/2008 | McGarraugh et al. |
| 2008/0065050 A1 | 3/2008 | Sparks et al. |
| 2008/0071157 A1 | 3/2008 | McGarraugh et al. |
| 2008/0071158 A1 | 3/2008 | McGarraugh et al. |
| 2008/0078400 A1 | 4/2008 | Martens et al. |
| 2008/0097289 A1 | 4/2008 | Steil et al. |
| 2008/0132880 A1 | 6/2008 | Buchman |
| 2008/0161664 A1 | 7/2008 | Mastrototaro et al. |
| 2008/0172026 A1* | 7/2008 | Blomquist .......... G06F 3/04842 604/500 |
| 2008/0177165 A1 | 7/2008 | Blomquist et al. |
| 2008/0188796 A1 | 8/2008 | Steil et al. |
| 2008/0200838 A1 | 8/2008 | Goldberger et al. |
| 2008/0206067 A1 | 8/2008 | De Corral et al. |
| 2008/0208113 A1 | 8/2008 | Damiano et al. |
| 2008/0214919 A1 | 9/2008 | Harmon et al. |
| 2008/0228056 A1 | 9/2008 | Blomquist et al. |
| 2008/0249386 A1 | 10/2008 | Besterman et al. |
| 2008/0269585 A1 | 10/2008 | Ginsberg |
| 2008/0269714 A1 | 10/2008 | Mastrototaro et al. |
| 2008/0269723 A1 | 10/2008 | Mastrototaro et al. |
| 2008/0287906 A1 | 11/2008 | Burkholz et al. |
| 2009/0006061 A1 | 1/2009 | Thukral et al. |
| 2009/0018406 A1 | 1/2009 | Yodfat et al. |
| 2009/0030398 A1 | 1/2009 | Yodfat et al. |
| 2009/0036753 A1 | 2/2009 | King |
| 2009/0043240 A1 | 2/2009 | Robinson et al. |
| 2009/0054753 A1 | 2/2009 | Robinson et al. |
| 2009/0069743 A1 | 3/2009 | Krishnamoorthy et al. |
| 2009/0069745 A1 | 3/2009 | Estes et al. |
| 2009/0069787 A1 | 3/2009 | Estes et al. |
| 2009/0099521 A1 | 4/2009 | Gravesen et al. |
| 2009/0105573 A1 | 4/2009 | Malecha |
| 2009/0131861 A1 | 5/2009 | Braig et al. |
| 2009/0156922 A1 | 6/2009 | Goldberger et al. |
| 2009/0156924 A1 | 6/2009 | Shariati et al. |
| 2009/0163781 A1 | 6/2009 | Say et al. |
| 2009/0198350 A1 | 8/2009 | Thiele |
| 2009/0221890 A1 | 9/2009 | Saffer et al. |
| 2009/0228214 A1 | 9/2009 | Say et al. |
| 2009/0318791 A1 | 12/2009 | Kaastrup |
| 2009/0326343 A1 | 12/2009 | Gable et al. |
| 2010/0057042 A1 | 3/2010 | Hayter |
| 2010/0114026 A1 | 5/2010 | Karratt et al. |
| 2010/0121170 A1 | 5/2010 | Rule |
| 2010/0137784 A1 | 6/2010 | Cefai et al. |
| 2010/0152658 A1 | 6/2010 | Hanson et al. |
| 2010/0174228 A1 | 7/2010 | Buckingham et al. |
| 2010/0211003 A1 | 8/2010 | Sundar et al. |
| 2010/0228110 A1 | 9/2010 | Tsoukalis |
| 2010/0262117 A1 | 10/2010 | Magni et al. |
| 2010/0262434 A1 | 10/2010 | Shaya |
| 2010/0295686 A1 | 11/2010 | Sloan et al. |
| 2010/0298765 A1 | 11/2010 | Budiman et al. |
| 2011/0021584 A1 | 1/2011 | Berggren et al. |

(56) References Cited

U.S. PATENT DOCUMENTS

| | | |
|---|---|---|
| 2011/0028817 A1 | 2/2011 | Jin et al. |
| 2011/0054390 A1 | 3/2011 | Searle et al. |
| 2011/0054399 A1 | 3/2011 | Chong et al. |
| 2011/0124996 A1 | 5/2011 | Reinke et al. |
| 2011/0144586 A1 | 6/2011 | Michaud et al. |
| 2011/0160652 A1 | 6/2011 | Yodfat et al. |
| 2011/0178472 A1 | 7/2011 | Cabiri |
| 2011/0190694 A1 | 8/2011 | Lanier, Jr. et al. |
| 2011/0202005 A1 | 8/2011 | Yodfat et al. |
| 2011/0218495 A1 | 9/2011 | Remde |
| 2011/0230833 A1 | 9/2011 | Landman et al. |
| 2011/0251509 A1 | 10/2011 | Beyhan et al. |
| 2011/0313680 A1 | 12/2011 | Doyle et al. |
| 2011/0316562 A1 | 12/2011 | Cefai et al. |
| 2012/0003935 A1 | 1/2012 | Ydon et al. |
| 2012/0010594 A1 | 1/2012 | Holt et al. |
| 2012/0030393 A1 | 2/2012 | Ganesh et al. |
| 2012/0053556 A1 | 3/2012 | Lee |
| 2012/0078067 A1 | 3/2012 | Kovatchev et al. |
| 2012/0078161 A1 | 3/2012 | Masterson et al. |
| 2012/0078181 A1 | 3/2012 | Smith et al. |
| 2012/0101451 A1 | 4/2012 | Boit et al. |
| 2012/0123234 A1 | 5/2012 | Atlas et al. |
| 2012/0136336 A1 | 5/2012 | Mastrototaro et al. |
| 2012/0190955 A1 | 7/2012 | Rao et al. |
| 2012/0203085 A1 | 8/2012 | Rebec |
| 2012/0203178 A1 | 8/2012 | Tverskoy |
| 2012/0215087 A1 | 8/2012 | Cobelli et al. |
| 2012/0225134 A1 | 9/2012 | Komorowski |
| 2012/0226259 A1 | 9/2012 | Yodfat et al. |
| 2012/0232520 A1 | 9/2012 | Sloan et al. |
| 2012/0238851 A1 | 9/2012 | Kamen et al. |
| 2012/0271655 A1 | 10/2012 | Knobel et al. |
| 2012/0277668 A1 | 11/2012 | Chawla et al. |
| 2012/0282111 A1 | 11/2012 | Nip et al. |
| 2012/0295550 A1 | 11/2012 | Wilson et al. |
| 2013/0030358 A1 | 1/2013 | Yodfat et al. |
| 2013/0158503 A1 | 6/2013 | Kanderian, Jr. et al. |
| 2013/0178791 A1 | 7/2013 | Javitt |
| 2013/0231642 A1 | 9/2013 | Doyle et al. |
| 2013/0253472 A1 | 9/2013 | Cabiri |
| 2013/0261406 A1 | 10/2013 | Rebec et al. |
| 2013/0296823 A1 | 11/2013 | Melker et al. |
| 2013/0317753 A1 | 11/2013 | Kamen et al. |
| 2013/0338576 A1 | 12/2013 | OConnor et al. |
| 2014/0005633 A1 | 1/2014 | Finan |
| 2014/0066886 A1 | 3/2014 | Roy et al. |
| 2014/0074033 A1 | 3/2014 | Sonderegger et al. |
| 2014/0121635 A1 | 5/2014 | Hayter |
| 2014/0128839 A1 | 5/2014 | Dilanni et al. |
| 2014/0135880 A1 | 5/2014 | Baumgartner et al. |
| 2014/0146202 A1 | 5/2014 | Boss et al. |
| 2014/0180203 A1 | 6/2014 | Budiman et al. |
| 2014/0180240 A1 | 6/2014 | Finan et al. |
| 2014/0200426 A1 | 7/2014 | Taub et al. |
| 2014/0200559 A1 | 7/2014 | Doyle et al. |
| 2014/0230021 A1 | 8/2014 | Birthwhistle et al. |
| 2014/0276554 A1 | 9/2014 | Finan et al. |
| 2014/0276556 A1 | 9/2014 | Saint et al. |
| 2014/0278123 A1 | 9/2014 | Prodhom et al. |
| 2014/0309615 A1* | 10/2014 | Mazlish ............... A61B 5/4839 604/504 |
| 2014/0316379 A1 | 10/2014 | Sonderegger et al. |
| 2014/0325065 A1 | 10/2014 | Birtwhistle et al. |
| 2015/0018633 A1 | 1/2015 | Kovachev et al. |
| 2015/0025329 A1 | 1/2015 | Amarasingham et al. |
| 2015/0025495 A1 | 1/2015 | Peyser |
| 2015/0120317 A1 | 4/2015 | Mayou et al. |
| 2015/0134265 A1 | 5/2015 | Kohlbrecher et al. |
| 2015/0165119 A1 | 6/2015 | Palerm et al. |
| 2015/0173674 A1 | 6/2015 | Hayes et al. |
| 2015/0213217 A1 | 7/2015 | Amarasingham et al. |
| 2015/0217052 A1 | 8/2015 | Keenan et al. |
| 2015/0217053 A1 | 8/2015 | Booth et al. |
| 2015/0265767 A1 | 9/2015 | Vazquez et al. |
| 2015/0306314 A1 | 10/2015 | Doyle et al. |
| 2015/0351671 A1 | 12/2015 | Vanslyke et al. |
| 2015/0366945 A1 | 12/2015 | Greene |
| 2016/0015891 A1 | 1/2016 | Papiorek |
| 2016/0038673 A1 | 2/2016 | Morales |
| 2016/0038689 A1 | 2/2016 | Lee et al. |
| 2016/0051749 A1 | 2/2016 | Istoc |
| 2016/0082187 A1 | 3/2016 | Schaible et al. |
| 2016/0089494 A1 | 3/2016 | Guerrini |
| 2016/0175520 A1 | 6/2016 | Palerm et al. |
| 2016/0228641 A1 | 8/2016 | Gescheit et al. |
| 2016/0243318 A1 | 8/2016 | Despa et al. |
| 2016/0256087 A1 | 9/2016 | Doyle et al. |
| 2016/0287512 A1 | 10/2016 | Cooper et al. |
| 2016/0302054 A1 | 10/2016 | Kimura et al. |
| 2016/0331310 A1 | 11/2016 | Kovatchev |
| 2016/0354543 A1 | 12/2016 | Cinar et al. |
| 2017/0049386 A1* | 2/2017 | Abraham ............... A61B 5/743 |
| 2017/0143899 A1 | 5/2017 | Gondhalekar et al. |
| 2017/0143900 A1 | 5/2017 | Rioux et al. |
| 2017/0156682 A1 | 6/2017 | Doyle et al. |
| 2017/0173261 A1 | 6/2017 | O'Connor et al. |
| 2017/0189625 A1 | 7/2017 | Cirillo et al. |
| 2017/0281877 A1 | 10/2017 | Marlin et al. |
| 2017/0296746 A1 | 10/2017 | Chen et al. |
| 2017/0311903 A1 | 11/2017 | Davis et al. |
| 2017/0348482 A1 | 12/2017 | Duke et al. |
| 2018/0036495 A1 | 2/2018 | Searle et al. |
| 2018/0040255 A1 | 2/2018 | Freeman et al. |
| 2018/0075200 A1 | 3/2018 | Davis et al. |
| 2018/0075201 A1 | 3/2018 | Davis et al. |
| 2018/0075202 A1 | 3/2018 | Davis et al. |
| 2018/0092576 A1 | 4/2018 | Ambrosio et al. |
| 2018/0126073 A1 | 5/2018 | Wu et al. |
| 2018/0169334 A1 | 6/2018 | Grosman et al. |
| 2018/0200434 A1 | 7/2018 | Mazlish et al. |
| 2018/0200438 A1 | 7/2018 | Mazlish et al. |
| 2018/0200441 A1 | 7/2018 | Desborough et al. |
| 2018/0204636 A1 | 7/2018 | Edwards et al. |
| 2018/0277253 A1 | 9/2018 | Gondhalekar et al. |
| 2018/0289891 A1 | 10/2018 | Finan et al. |
| 2018/0296757 A1 | 10/2018 | Finan et al. |
| 2018/0342317 A1 | 11/2018 | Skirble et al. |
| 2018/0369479 A1 | 12/2018 | Hayter et al. |
| 2019/0076600 A1 | 3/2019 | Grosman et al. |
| 2019/0240403 A1 | 8/2019 | Palerm et al. |
| 2019/0290844 A1 | 9/2019 | Monirabbasi et al. |
| 2019/0336683 A1 | 11/2019 | O'Connor et al. |
| 2019/0336684 A1 | 11/2019 | O'Connor et al. |
| 2019/0348157 A1 | 11/2019 | Booth et al. |
| 2020/0046268 A1 | 2/2020 | Patek et al. |
| 2020/0101222 A1 | 4/2020 | Lintereur et al. |
| 2020/0101223 A1 | 4/2020 | Lintereur et al. |
| 2020/0101225 A1 | 4/2020 | O'Connor et al. |
| 2020/0197605 A1* | 6/2020 | Haidar ............... G05B 13/048 |
| 2020/0219625 A1 | 7/2020 | Kahlbaugh |
| 2020/0342974 A1 | 10/2020 | Chen et al. |
| 2021/0050085 A1 | 2/2021 | Hayter et al. |
| 2021/0098105 A1 | 4/2021 | Lee et al. |
| 2022/0023536 A1 | 1/2022 | Graham et al. |

FOREIGN PATENT DOCUMENTS

| | | |
|---|---|---|
| CN | 1297140 A | 5/2001 |
| DE | 19756872 A1 | 7/1999 |
| EP | 0341049 A2 | 11/1989 |
| EP | 0496305 A2 | 7/1992 |
| EP | 0549341 A1 | 6/1993 |
| EP | 1491144 A1 | 12/2004 |
| EP | 1571582 A2 | 9/2005 |
| EP | 0801578 B1 | 7/2006 |
| EP | 2666520 A1 | 10/2009 |
| EP | 2139382 A1 | 1/2010 |
| EP | 2397181 A1 | 12/2011 |
| EP | 2695573 A2 | 2/2014 |
| EP | 2830499 A1 | 2/2015 |
| EP | 2943149 A1 | 11/2015 |
| EP | 3177344 A1 | 6/2017 |
| EP | 3314548 A1 | 5/2018 |

(56) References Cited

FOREIGN PATENT DOCUMENTS

| | | |
|---|---|---|
| EP | 2897071 B1 | 5/2019 |
| EP | 3607985 A1 | 2/2020 |
| GB | 2443261 A | 4/2008 |
| JP | 51125993 A | 11/1976 |
| JP | 02131777 A | 5/1990 |
| JP | 2004283378 A | 10/2007 |
| JP | 2017525451 A | 9/2017 |
| JP | 2018153569 A | 10/2018 |
| JP | 2019525276 A | 9/2019 |
| NO | 0172354 A2 | 10/2001 |
| TW | 200740148 A | 10/2007 |
| TW | M452390 U | 5/2013 |
| WO | 9800193 A1 | 1/1998 |
| WO | 9956803 A1 | 11/1999 |
| WO | 0030705 A1 | 6/2000 |
| WO | 0032258 A1 | 6/2000 |
| WO | 2002015954 A1 | 2/2002 |
| WO | 0243866 A2 | 6/2002 |
| WO | 02082990 A1 | 10/2002 |
| WO | 03016882 A1 | 2/2003 |
| WO | 03039362 A1 | 5/2003 |
| WO | 03045233 A1 | 6/2003 |
| WO | 2004043250 A1 | 5/2004 |
| WO | 04092715 A1 | 10/2004 |
| WO | 2005051170 A2 | 6/2005 |
| WO | 2005082436 A1 | 9/2005 |
| WO | 05110601 A1 | 11/2005 |
| WO | 2005113036 A1 | 12/2005 |
| WO | 2006053007 A2 | 5/2006 |
| WO | 2007064835 A2 | 6/2007 |
| WO | 2007078937 A1 | 7/2007 |
| WO | 2008024810 A2 | 2/2008 |
| WO | 2008029403 A1 | 3/2008 |
| WO | 2008133702 A1 | 11/2008 |
| WO | 2009045462 A1 | 4/2009 |
| WO | 2009049252 A1 | 4/2009 |
| WO | 2009066287 A3 | 5/2009 |
| WO | 2009066288 A1 | 5/2009 |
| WO | 2009098648 A2 | 8/2009 |
| WO | 2009134380 A2 | 11/2009 |
| WO | 2010053702 A1 | 5/2010 |
| WO | 2010132077 A1 | 11/2010 |
| WO | 2010138848 A1 | 12/2010 |
| WO | 2010147659 A2 | 12/2010 |
| WO | 2011095483 A1 | 8/2011 |
| WO | 2012045667 A2 | 4/2012 |
| WO | 2012108959 A1 | 8/2012 |
| WO | 2012134588 A1 | 10/2012 |
| WO | 2012177353 A1 | 12/2012 |
| WO | 2012178134 A2 | 12/2012 |
| WO | 2013078200 A1 | 5/2013 |
| WO | 2013134486 A2 | 9/2013 |
| WO | 20130149186 A1 | 10/2013 |
| WO | 2013177565 A1 | 11/2013 |
| WO | 2013182321 A1 | 12/2013 |
| WO | 2014109898 A1 | 7/2014 |
| WO | 2014110538 A1 | 7/2014 |
| WO | 2014194183 A2 | 12/2014 |
| WO | 2015056259 A1 | 4/2015 |
| WO | 2015061493 A1 | 4/2015 |
| WO | 2015073211 A1 | 5/2015 |
| WO | 2015081337 A2 | 6/2015 |
| WO | 2015187366 A1 | 12/2015 |
| WO | 2016004088 A1 | 1/2016 |
| WO | 2016022650 A1 | 2/2016 |
| WO | 2016041873 A1 | 3/2016 |
| WO | 2016089702 A1 | 6/2016 |
| WO | 2016141082 A1 | 9/2016 |
| WO | 2016161254 A1 | 10/2016 |
| WO | 2017004278 A1 | 1/2017 |
| WO | 2017091624 A1 | 6/2017 |
| WO | 2017105600 A1 | 6/2017 |
| WO | 2017184988 A1 | 10/2017 |
| WO | 2017205816 A1 | 11/2017 |
| WO | 2018009614 A1 | 1/2018 |
| WO | 2018067748 A1 | 4/2018 |
| WO | 2018120104 A1 | 7/2018 |
| WO | 2018136799 A1 | 7/2018 |
| WO | 2018204568 A1 | 11/2018 |
| WO | 2019077482 A1 | 4/2019 |
| WO | 2019094440 A1 | 5/2019 |
| WO | 2019213493 A1 | 11/2019 |
| WO | 2019246381 A1 | 12/2019 |
| WO | 2020081393 A1 | 4/2020 |
| WO | 2021011738 A1 | 1/2021 |

OTHER PUBLICATIONS

International Search Report and Written Opinion for the International Patent Application No. PCT/US2021/022694, mailed Jun. 25, 2021, 13 pages.

Unger, Jeff, et al., "Glucose Control in the Hospitalized Patient," Emerg. Med 36(9):12-18 (2004).

Glucommander FAQ downloaded from https://adaendo.com/GlucommanderFAQ.html on Mar. 16, 2009.

Finfer, Simon & Heritier, Stephane. (2009). The NICE-SUGAR (Normoglycaemia in Intensive Care Evaluation and Survival Using Glucose Algorithm Regulation) Study: statistical analysis plan. Critical care and resuscitation : journal of the Australasian Academy of Critical Care Medicine. 11. 46-57.

Letters to the Editor regarding "Glucose Control in Critically Ill Patients," N Engl J Med 361: 1, Jul. 2, 2009.

"Medtronic is Leading a Highly Attractive Growth Market," Jun. 2, 2009.

Davidson, Paul C., et al. "Glucommander: An Adaptive, Computer-Directed System for IV Insulin Shown to be Safe, Simple, and Effective in 120,618 Hours of Operation," Atlanta Diabetes Associates presentation Nov. 16, 2003.

Davidson, Paul C., et al. "Pumpmaster and Glucommander," presented at the MiniMed Symposium, Atlanta GA, Dec. 13, 2003.

Kanji S., et al. "Reliability of point-of-care testing for glucose measurement in critically ill adults," Critical Care Med, vol. 33, No. 12, pp. 2778-2785, 2005.

Krinsley James S., "Severe hypoglycemia in critically ill patients: Risk factors and outcomes," Critical Care Med, vol. 35, No. 10, pp. 1-6, 2007.

European Patent Office, "Notification of Transmittal of the ISR and the Written Opinion of the International Searching Authority, or the Declaration," in PCT Application No. PCT/GB2015/050248, Jun. 23, 2015, 12 pages.

Farkas et al. ""Single-Versus Triple-Lumen Central Catheter-Related Sepsis: A Prospective Randomized Study in a Critically Ill Population"" The American Journal of Medicine September 1992 vol. 93 p. 277-282.

Davidson, Paul C., et al., A computer-directed intravenous insulin system shown to be safe, simple, and effective in 120,618 h of operation, Diabetes Care, vol. 28, No. 10, Oct. 2005, pp. 2418-2423.

International Search Report and Written Opinion for the International Patent Application No. PCT/US2021/016283, mailed Jun. 2, 2021, 15 pages.

Gorke, A. "Microbial contamination of haemodialysis catheter connections." EDTNA/ERCA journal (English ed.) vol. 31,2 (2005): 79-84. doi:10.1111/j.1755-6686.2005.tb00399.x.

Lovich et al. "Central venous catheter infusions: A laboratory model shows large differences in drug delivery dynamics related to catheter dead volume" Critical Care Med 2007 vol. 35, No. 12.

Van Den Berghe, Greet, M.D., Ph.D., et al., Intensive Insulin Therapy in Critically Ill Patients, The New England Journal of Medicine, vol. 345, No. 19, Nov. 8, 2001, pp. 1359-1367.

Templeton et al., "Multilumen Central Venous Catheters Increase Risk for Catheter-Related Bloodstream Infection: Prospective Surveillance Study" Infection 2008; 36: 322-327.

Wilson, George S., et al., Progress toward the Development of an Implantable Sensor for Glucose, Clin. Chem., vol. 38, No. 9, 1992, pp. 1613-1617.

(56) References Cited

OTHER PUBLICATIONS

Yeung et al. "Infection Rate for Single Lumen v Triple Lumen Subclavian Catheters" Infection Control and Hospital Epidemiology, vol. 9, No. 4 (Apr. 1988) pp. 154-158 The University of Chicago Press.
International Search Report and Written Opinion, International Application No. PCT/US2010/033794 mailed Jul. 16, 2010.
International Search Report and Written Opinion in PCT/US2008/079641 dated Feb. 25, 2009.
Berger, "'Measurement of Analytes in Human Serum and Whole Blood Samples by Near-Infrared Raman Spectroscopy,'" Ph.D. Thesis, Massachusetts Institute of Technology, Chapter 4, pp. 50-73, 1998.
Berger, "An Enhanced Algorithm for Linear Multivariate Calibration," Analytical Chemistry, vol. 70, No. 3, pp. 623-627, Feb. 1, 1998.
Billman et al., "Clinical Performance of an In line Ex-Vivo Point of Care Monitor: A Multicenter Study," Clinical Chemistry 48: 11, pp. 2030-2043, 2002.
Widness et al., "Clinical Performance on an In-Line Point-of-Care Monitor in Neonates"; Pediatrics, vol. 106, No. 3, pp. 497-504, Sep. 2000.
Finkielman et al., "Agreement Between Bedside Blood and Plasma Glucose Measurement in the ICU Setting"; retrieved from http://www.chestjournal.org; CHEST/127/5/May 2005.
Glucon Critical Care Blood Glucose Monitor; Glucon; retrieved from http://www.glucon.com.
Fogt, et al., "Development and Evaluation of a Glucose Analyzer for a Glucose-Controlled Insulin Infusion System (Biostator)"; Clinical Chemistry, vol. 24, No. 8, pp. 1366-1372, 1978.
Vonach et al., "Application of Mid-Infrared Transmission Spectrometry to the Direct Determination of Glucose in Whole Blood," Applied Spectroscopy, vol. 52, No. 6, 1998, pp. 820-822.
Muniyappa et al., "Current Approaches for assessing insulin sensitivity and resistance in vivo: advantages, imitations, and appropriate usage," AJP-Endocrinol Metab, vol. 294, E15-E26, first published Oct. 23, 2007.
R Anthony Shaw, et al., "Infrared Spectroscopy in Clinical and Dianostic Analysis," Encyclopedia of Analytical Chemistry, ed. Robert A. Meyers, John Wiley & Sons, Ltd., pp. 1-20, 2000.
International Preliminary Report on Patentability for the International Patent Application No. PCT/US2019/053603, mailed Apr. 8, 2021, 9 pages.
International Search Report and Written Opinion for the International Patent Application No. PCT/US2019/053603, mailed Jan. 7, 2020, 16 pages.
Dassau et al., "Detection of a meal using continuous glucose monitoring: Implications for an artificial [beta]-cell." Diabetes Care, American Diabetes Association, Alexandria, VA, US, 31(2):295-300 (2008).
Cameron et al., "Probabilistic Evolving Meal Detection and Estimation of Meal Total Glucose Appearance Author Affiliations", J Diabetes Sci and Tech,vol. Diabetes Technology Society ;(5):1022-1030 (2009).
Lee et al., "A closed-loop artificial pancreas based on model predictive control: Human-friendly identification and automatic meal disturbance rejection", Biomedical Signal Processing and Control, Elsevier, Amsterdam, NL, 4(4):1746-8094 (2009).
International Search Report and Written Opinion for the InternationalPatent Application No. PCT/US2021/018297, mailed May 18, 2021, 18 pages.
An Emilia Fushimi: "Artificial Pancreas: Evaluating the ARG Algorithm Without Meal Announcement", Journal of Diabetes Science and Technology Diabetes Technology Society, Mar. 22, 2019, pp. 1025-1043.
International Search Report and Written Opinion for the International Patent Application No. PCT/US2021/017441, mailed May 25, 2021, 12 pages.
International Search Report and Written Opinion for the InternationalPatent Application No. PCT/US2021/017664, mailed May 26, 2021, 16 pages.
Mirko Messori et al: "Individualized model predictive control for the artificial pancreas: In silico evaluation of closed-loop glucose control", IEEE Control Systems, vol. 38, No. 1, Feb. 1, 2018, pp. 86-104.
International Search Report and Written Opinion for the International Patent Application No. PCT/US2021/017662, mailed May 26, 2021, 14 pages.
Anonymous: "Reservoir Best Practice and Top Tips" Feb. 7, 2016, URL: https://www.medtronic-diabetes.co.uk/blog/reservoir-best-practice-and-top-tips, p. 1.
Gildon Bradford: "InPen Smart Insulin Pen System: Product Review and User Experience" Diabetes Spectrum, vol. 31, No. 4, Nov. 15, 2018, pp. 354-358.
International Search Report and Written Opinion for the International Patent Application No. PCT/US2021/016050, mailed May 27, 2021, 16 pages.
International Search Report and Written Opinion for the International Patent Application No. PCT/US2020/065226, mailed May 31, 2021, 18 pages.
International Search Report and Written Opinion for the International Patent Application No. PCT/US2021/017659, mailed May 31, 2021, 13 pages.
Montaser Eslam et al., "Seasonal Local Models for Glucose Prediction in Type 1 Diabetes", IEE Journal of Biomedical and Health Informatics, IEEE, Piscataway, NJ, USA, vol. 24, No. 7, Jul. 2020, pp. 2064-2072.
Samadi Sediqeh et al., "Meal Detection and Carbohydrate Estimation Using Continuous Glucose Sensor Data" IEEE Journal of Biomedical and Health Informatics, IEEE, Piscataway, NJ, USA, vol. 21, No. 3, May 1, 2017, pp. 619-627.
Samadi Sediqeh et al., "Automatic Detection and Estimation of Unannouced Meals for Multivariable Artificial Pancreas System", Diabetis Technology & Therapeutics, vol. 20m No. 3, Mar. 1, 2018, pp. 235-246.
European Search Report for the European Patent Application No. 21168591.2, mailed Oct. 13, 2021, 04 pages.
International Search Report and Written Opinion for the International Patent Application No. PCT/US2021/041954, mailed Oct. 25, 2021, 13 pages.
International Search Report and Written Opinion for the International Patent Application No. PCT/US2021/047771, mailed Dec. 22, 2021, 11 pages.
International Search Report and Written Opinion for the International Patent Application No. PCT/US2021/052855, mailed Dec. 22, 2021, 11 pages.
Kohdaei et al., "Physiological Closed-Loop Contol (PCLC) Systems: Review of a Modern Frontier in Automation", IEEE Access, IEEE, USA, vol. 8, Jan. 20, 2020, pp. 23965-24005.
E. Atlas et al., "MD-Logic Artificial Pancreas System: A pilot study in adults with type 1 diabetes", Diabetes Care, vol. 33, No. 5, Feb. 11, 2010, pp. 1071-1076.
Anonymous: "Fuzzy control system", Wikipedia, Jan. 10, 2020. URL: https://en.wikipedia.org/w/index.php?title=Fuzzy_control_system&oldid=935091190.
International Search Report and Written Opinion for International Patent Application No. PCT/US2021/051027, mailed on Jan. 7, 2022, 16 pages.
International Search Report and Written Opinion for International Patent Application No. PCT/US2021/052372, mailed Jan. 26, 2022, 15 pages.
International Search Report and Written Opinion for the International Patent Application No. PCT/US2021/046607, mailed Jan. 31, 2022, 20 pages.
International Search Report and Written Opinion for the International Patent Application No. PCT/US2021/055745, mailed Feb. 14, 2022, 13 pages.
Anonymous: "Artificial pancreas—Wikipedia", Mar. 13, 2018 (Mar. 13, 2018), XP055603712, Retrieved from the Internet: URL: https://en.wikipedia.org/wiki/Artificial_pancreas [retrieved on Jul. 9, 2019]

(56) References Cited

OTHER PUBLICATIONS section "Medical Equipment" and the figure labeled "The medical equipment approach to an artifical pancreas".
Kaveh et al., "Blood Glucose Regulation via Double Loop Higher Order Sliding Mode Control and Multiple Sampling Rate." Paper presented at the proceedings of the 17th IFAC World Congress, Seoul, Korea (Jul. 2008).
Dassau et al., "Real-Time Hypoglycemia Prediction Suite Using Contineous Glucose Monitoring," Diabetes Care, vol. 33, No. 6, 1249-1254 (2010).
International Search Report and Written Opinion for International Patent Application No. PCT/US17/53262, mailed on Dec. 13, 2017, 8 pages.
Van Heusden et al., "Control-Relevant Models for Glucose Control using a Priori Patient Characteristics", IEEE Transactions on Biomedical Engineering, vol. 59, No. 7, (Jul. 1, 2012) pp. 1839-1849.
Doyle III et al., "Run-to-Run Control Strategy for Diabetes Management." Paper presented at 23rd Annual International Conference of the IEEE Engineering in Medicine and Biology Society, Istanbul, Turkey. (Oct. 2001).
Bequette, B.W., and Desemone, J., "Intelligent Dosing Systems": Need for Design and Analysis Based on Control Theory, Diabetes Technology and Therapeutics 9(6): 868-873 (2004).
Parker et al., "A Model-Based Agorithm for Blood Gucose Control in Type 1 Diabetic Patients." IEEE Transactions on Biomedical Engineering, 46 (2) 148-147 (1999).
International Search Report and Written Opinion for International Patent Application No. PCT/US2017/015601, mailed May 16, 2017, 12 pages.
International Search Report and Written Opinion for the International Patent Application No. PCT/US2018/018901, mailed on Aug. 6, 2018, 12 pages.
International Search Report and Written Opinion for International Patent Application No. PCT/US2018/052467, mailed Jan. 4, 2019, 13 pages.
"How to Create a QR Code that Deep Links to Your Mobile App", Pure Oxygen Labs, web<https://pureoxygenlabs.com/how-to-create-a-qr-codes-that-deep-link-to-your-mobile-app/> Year:2017.
"Read NFC Tags with an iPHone App on iOS 11", GoToTags, Sep. 11, 2017, web <https://gototags.com/blog/read-hfc-tags-with-an-iphone-app-on-ios-11/> (Year:2017).
International Search Report and Written Opinion for International Patent Application No. PCT/US2016/063350, mailed on Mar. 27, 2017, 9 pages.
Extended Search Report mailed Aug. 13, 2018, issued in European Patent Application No. 16753053.4, 9 pages.
International Search Report and Written Opinion for International Patent Application No. PCT/US16/18452, mailed on Apr. 29, 2015, 9 pages.
International Preliminary Report on Patentability mailed Aug. 31, 2017, issued in PCT Patent Application No. PCT/US2016/018452, 7 pages.
International Search Report and Written Opinion for International Patent Application No. PCT/US2019/055862, mailed on Mar. 11, 2020.
International Search Report and Written Opinion for Application No. PCT/US2019/030562, Sep. 25, 2019, 19 bages.
International Search Report and Written Opinion for the International Patent Application No. PCT/US2020/050332, mailed Sep. 12, 2020, 12 pages.
International Search Report and Written Opinion for the International Patent Application No. PCT/US2020/052125, mailed Aug. 12, 2020, 15 pages.
International Search Report and Written Opinion for the International Patent Application No. PCT/US2022/012896, mailed Apr. 22, 2022, 15 pages.
International Search Report and Written Opinion for the International Patent Application No. PCT/US2022/013470, mailed May 6, 2022, 14 pages.
International Search Report and Written Opinion for the International Patent Application No. PCT/US2022/013473, mailed May 6, 2022, 13 pages.
International Search Report and Written Opinion for the International Patent Application No. PCT/US2022/019079, mailed Jun. 2, 2022, 14 pages.
International Search Report and Written Opinion for the International Patent Application No. PCT/US2022/018453, mailed Jun. 2, 2022, 13 pages.
International Search Report and Written Opinion for the International Patent Application No. PCT/US22/018700, mailed Jun. 7, 2022, 13 pages.
International Search Report and Written Opinion for the International Patent Application No. PCT/US22/019080, mailed Jun. 7, 2022, 14 pages.
International Search Report and Written Opinion for the International Patent Application No. PCT/US22/019664, mailed Jun. 7, 2022, 14 pages.
International Search Report and Written Opinion for the International Patent Application No. PCT/US21/060618, mailed Mar. 21, 2022, 15 pages.
Herrero Pau et al: "Enhancing automatic closed-loop glucose control in type 1 diabetes with an adaptive meal polus calculator -in silicoevaluation under intra-day variability", Computer Methods and Programs in Biomedicine, Elsevier, Amsterdam, NL, vol. 146, Jun. 1, 2017 (Jun. 1, 2017), pp. 125-131, XP085115607, ISSN: 0169-2607, DOI:10.1016/J.CMPB.2017.05.010.
Marie Aude Qemerais: "Preliminary Evaluation of a New Semi-Closed-Loop Insulin Therapy System over the prandial period in Adult Patients with type I diabetes: the WP6. 0 Diabeloop Study", Journal of Diabetes Science and Technology Diabetes Technology Society Reprints and permissions, Jan. 1, 2014, pp. 1177-1184, Retrieved from the Internet: URL:http://journals.sagepub.com/doi/pdf/10.1177/1932296814545668 [retrieved on Jun. 6, 2022] chapter "Functioning of the Algorithm" chapter "Statistical Analysis" p. 1183, left-hand column, line 16-line 23.
Anonymous: "Kernel density estimation", Wikipedia, Nov. 13, 2020 (Nov. 13, 2020), pp. 1-12, XP055895569, Retrieved from the Internet: URL:https://en.wikipedia.org/w/index.php?title=Kernel_density_estimation&oldid=988508333 [retrieved on Jun. 6, 2022].
Anonymous: "openaps / oref0 /lib/determine-basal-js", openaps repository, Nov. 9, 2019 (Nov. 9, 2019), pp. 1-17, XP055900283, Retrieved from the Internet: URL:https://github.com/openaps/oref0/blob/master/lib/determine-basal/determine-basal.js [retrieved on Jun. 6, 2022] line 116-line 118, line 439-line 446.
Anonymous: "AndroidAPS screens", AndroidAPS documentation, Oct. 4, 2020 (Oct. 4, 2020), pp. 1-12, KP055894824, Retrieved from the Internet: URL:https://github.com/openaps/AndroidAPSdocs/blob/25d8acf8b28262b411b34f416f173ac0814d7e14/docs/EN/Getting-Started/Screenshots.md [retrieved on Jun. 6, 2022].
Kozak Milos et al: "Issue #2473 of AndroidAPS", MilosKozak / AndroidAPS Public repository, Mar. 4, 2020 (Mar. 4, 2020), pp. 1-4, XP055900328, Retrieved from the Internet: URL:https://github.com/MilosKozak/AndroidAPS/issues/2473 [retrieved on Jun. 6, 2022].
Medication Bar Code System Implementation Planning Section I: A Bar Code Primer for Leaders, Aug. 2013.
Medication Bar Code System Implementation Planning Section II: Building the Case for Automated Identification of Medications, Aug. 2013.
Villareal et al. (2009) in: Distr. Comp. Art. Intell. Bioninf. Soft Comp. Amb. Ass. Living; Int. Work Conf. Art. Neural Networks (IWANN) 2009, Lect. Notes Comp. Sci. vol. 5518; S. Omatu et al. (Eds.), pp. 870-877.
Fox, Ian G.; Machine Learning for Physiological Time Series: Representing and Controlling Blood Glucose for Diabetes Management; University of Michigan. ProQuest Dissertations Publishing, 2020. 28240142. (Year: 2020).

* cited by examiner

MEAL BOLUS SUBCATEGORIES IN MODEL BASED INSULIN THERAPY

BACKGROUND

Due to the complicated and dynamic nature of the human body's response to insulin, patients may end up in a hypoglycemic or hyperglycemic state after being treated with insulin therapy. This outcome is undesirable for many reasons: hypoglycemia creates an immediate risk of a severe medical event (seizure, coma, death) while hyperglycemia creates long term negative health effects as well as the risk of ketoacidosis. Whether a person ends up in one of these states depends on a combination of data inputs and responses.

Mealtime is particularly difficult for diabetic users to manage because users have to estimate an amount of carbohydrates a meal contains and estimate an amount of insulin to deliver to mitigate the effects of the meal. While a closed loop system reduces the amount of engagement required from users, users typically still predict an amount of insulin to be delivered as a bolus to compensate for the meal and preemptively deliver insulin before the carbohydrates in the food making up the meal are absorbed.

It would be beneficial to mitigate this need for prediction and minimizing user involvement.

SUMMARY

Disclosed is an example of a non-transitory computer readable medium embodied with programming code executable by a processor. The processor when executing the programming code is operable to perform functions. The processor may receive information related to ingestion of a meal. The information may include a coarse indication of a size of the meal, a relative time of ingestion of the meal, and a general composition indication of the meal. A meal model may be selected from a number of meal models. A setting for a delay parameter may be determined based on the received relative time of ingestion of the meal, a setting for an extend parameter may be determined based on the received general composition indication of the meal, and a setting for a delivery constraint may be determined based on the received coarse indication of the size of the meal. The selected meal model may be modified using the determined setting for the delay parameter, the determined setting for the extend parameter, and the determined setting for the delivery constraint. A dose of insulin to be delivered in response to the received information may be determined using the modified, selected meal model. An instruction may be output for delivery to a drug delivery device. The outputted instruction may indicate a determined dose of insulin to be delivered.

An example of a device is disclosed that includes a processor and a memory. The memory may be operable to store programming code, an artificial pancreas application, and data related to the artificial pancreas application. The programming code and the artificial pancreas application are executable by the processor. The processor when executing the artificial pancreas application may be operable to control delivery of insulin, and to perform functions. The processor may receive information related to ingestion of a meals. The information may include a coarse indication of a size of the meal, a relative time of ingestion of the meal, and a general composition indication of the meal. A blood glucose measurement value that was received within a predetermined time range of the relative time of ingestion of the meal may be identified. A meal model may be selected from a number of meal models based on the identified blood glucose measurement value. A setting for a delay parameter may be determined based on the received relative time of ingestion of the meal. A setting for an extend parameter may be determined based on the received general composition indication of the meal. A setting for a delivery constraint may be determined based on the received coarse indication of the size of the meal. The selected meal model may be modified using the determined setting for the delay parameter, the determined setting for the extend parameter, and the determined setting for the delivery constraint. a dose of insulin to be delivered in response to the received information may be determined using the modified, selected meal model. An instruction that indicates a determined dose of insulin to be delivered may be output for delivery to a drug delivery device.

DETAILED DESCRIPTION

Figure 1:
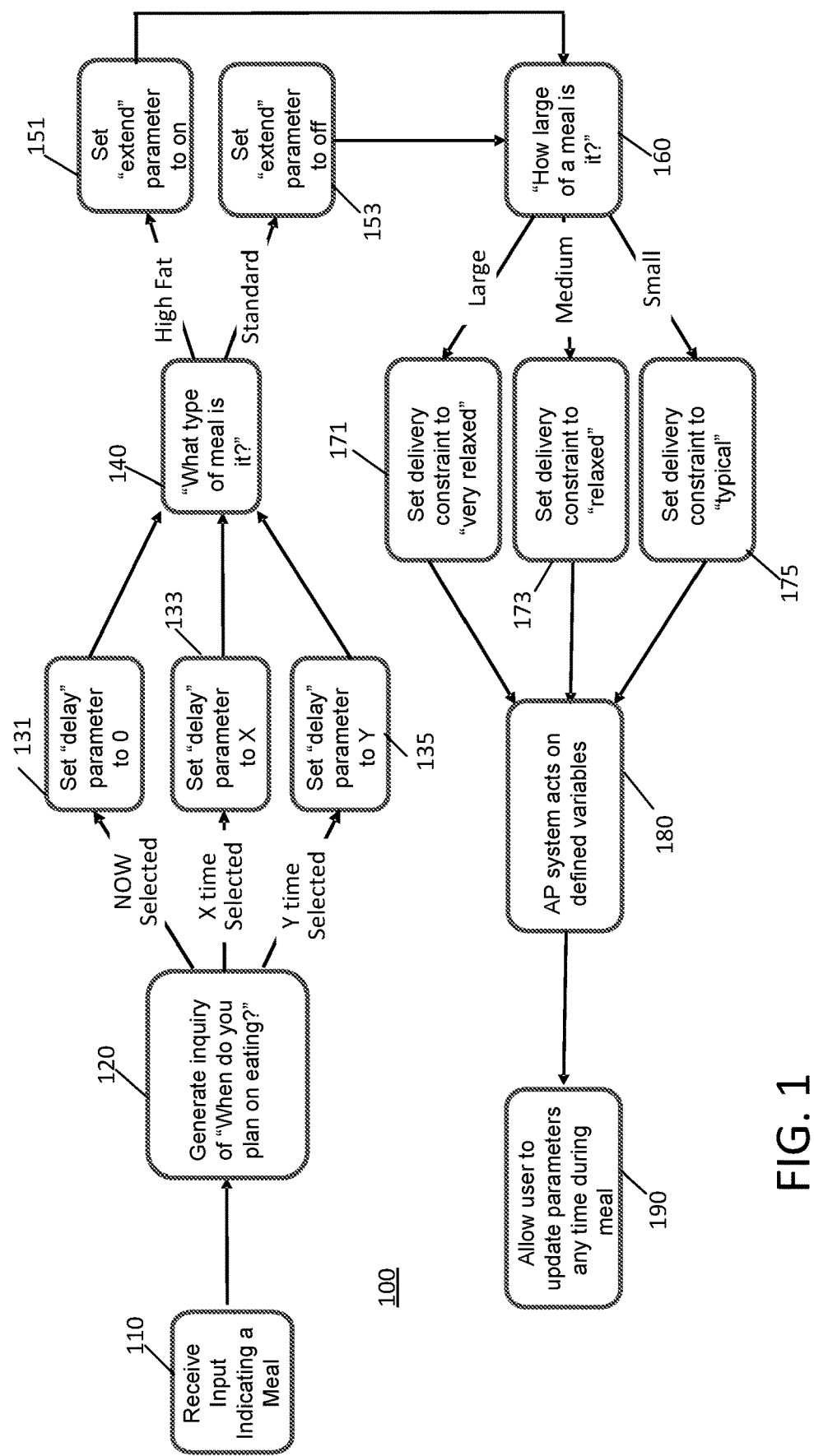
FIG. 1 illustrates an example of a process for updating model parameters related to a meal and implementing actions based a model using the updated model parameters.

One or more examples provide a process that may be used with or by any additional algorithms or computer applications. The additional algorithms or computer applications may be referred to as an "artificial pancreas" algorithm-based system, or more generally, an artificial pancreas (AP) application, that provides automatic delivery of an insulin based on a blood glucose sensor input, such as that received from a CGM or the like. Examples of an artificial pancreas (AP) application as described herein may manage blood glucose levels and provide insulin therapy. The AP application may be a third-party artificial pancreas application that allows data provided by algorithms executing the process examples described herein In an example, the artificial pancreas (AP) application when executed by a processor may enable a system to monitor a user's glucose values, determine an appropriate level of insulin for the user based on the monitored glucose values (e.g., blood glucose concentrations or blood glucose measurement values) and other information, such as user-provided information, such as carbohydrate intake, exercise times, meal times or the like, and take actions to maintain a user's blood glucose value within an appropriate range. The appropriate blood glucose value range may be considered a target blood glucose value of the particular user. For example, a target blood glucose value may be acceptable if it falls within the range of approximately 80 mg/dL to approximately 120 mg/dL, which is a range satisfying the clinical standard of care for treatment of diabetes. However, an AP application as described herein may be able to establish a target blood glucose value more precisely and may set the target blood glucose value at, for example, 110 mg/dL, or the like. As described in more detail with reference to the examples of FIGS. 1-5, the AP application may utilize the monitored blood glucose values and other information to generate and send a command to a medical device including, for example, a pump, to control delivery of insulin to the user, change the amount or timing of future doses, as well as to control other functions based on user history, such as, for example, the modification of constraints on the amount or timing of doses of insulin, generation of prompts, receipt of inputs from a user, or the like.

To mitigate the need for user prediction and enable minimal user involvement, the disclosed examples provide a device, a system, a computer application or algorithm, computer-readable medium product and techniques that utilize meal models to address eating carbohydrates at mealtime. The use of a meal model is advantageous because it reduces user involvement as well as the burden on the user of estimating carbohydrates in a meal and calculating a resulting meal bolus dosage. In addition, the described examples also may enable automates processes to treat increasing blood glucose measurement values more aggressively without the user having to fear a hypoglycemic episode, which may happen with a mistaken estimate of an amount of carbohydrates in a meal or an amount of insulin in a meal bolus.

The meal models described in the following examples may be broken down into several categories based on a type of meal, timing of the meal, and a size of the meal. For example, the type of meal may be the composition of the meal and may be broken down as high fat, low fat or standard. Timing of the meal may be a meal that is in progress, in 15 minutes, in 30 minutes, or the like. In the examples, the size of meal may be broken up into coarse descriptions (e.g., small, medium, or large) rather than a specific estimate of an amount of carbohydrates. The example information allows the algorithm that controls insulin delivery to adjust a meal model to be more aggressive with insulin delivery by, for example, knowing what portion of the mealtime should be extended, when to begin delivery, and when to return to the standard basal model for insulin delivery.

In the examples, the information provided by a user may include the timing of the meal with reference to an input to the AP application. For example, a graphical user interface presented on a user interface of a PDM or other device may enable inputs related to the timing of the meal, such as "eating now," "started eating X minutes ago," "expect to eat in Y minutes," "finished eating U minutes ago," or the like. The AP application may, for example, in response to receiving, the input from the graphical user interface and estimate a blood glucose measurement value that a continuous blood glucose device is expected to provide after ingestion of the meal based on information related to the meal. In an example, the continuous blood glucose device may provide a blood glucose measurement value every 5 minutes to the AP application. The effects of the meal on the blood glucose measurement values may not be noticeable until after several blood glucose measurements are received. For example, the time between ingesting a meal and a change in blood glucose measurement values may be several minutes as the user's blood glucose must react to the ingestion of carbohydrates, and that reaction may take time to manifest itself in the change in blood glucose measurement values. The AP application may determine an amount of time needed to identify a change in blood glucose measurement values. After the determined amount of time, the AP application may compare the estimated blood glucose measurement value to a blood glucose measurement value received at the expected time. Based on the result of the comparison, the AP application may confirm whether the meal was ingested according to the input received from the graphical user interface or whether the input received from the graphical user interface was in error.

The AP application may conclude with providing increased insulin delivery as a reaction to increasing blood glucose measurement values that are greater than normal with the knowledge the user had recently eaten. The magnitude of the reaction allowable would be determined by the selected meal model and known metrics related to the user, such as Total Daily Insulin (TDI), Correction Factor, and Carbohydrate Ratio. Based on results of the described processes, the initial treatment target (e.g., amount of insulin to be delivered as a meal bolus in response to a meal as well as subsequent basal insulin deliveries) may also be adjusted to compensate for the greater insulin onboard (IOB) during this period. For example, the immediate bolus size versus extended bolus size and length may also be predicted using the selected meal model.

In addition, feedback in the form of blood glucose measurement values provided by a continuous blood glucose monitor (CGM), for example, may be tracked and the meal models may be further tailored to the individual based on the feedback results to become more effective over time.

This approach may make meal bolusing a less stressful experience for the user and allow the closed loop system to do more of the therapy adjustment rather than depending on the user for accurate meal estimation. An advantage of the described examples is the elimination of a user having to estimate a bolus amount for meals thereby enhancing the user's experience with the described AP application or a closed-loop insulin treatment system.

FIG. 1 illustrates an example of a process for updating model parameters related to a meal and implementing actions based on a model using the updated model parameters. For example, the AP application may implement a model when calculating bolus insulin doses. The model may have different parameters that may be set based on one or more of: a user's activity, user insulin delivery history, a user's blood glucose measurement value history, a user's insulin sensitivity, a user's insulin-to-carbohydrate ratio, or the like.

In the process 100, a user may be presented with a graphical user interface operable to receive inputs related to a user's mealtime experience. For example, the graphical user interface may have a "meal" button or some other input device, such as a microphone, that when actuated indicates to the AP application that the user is considering a meal. As shown at 110, a meal indication input may be received via the graphical user interface by the AP application. At 120, in response to receiving the input indicating a meal is imminent, the AP application may be operable to generate an inquiry that is output via the graphical user interface, requesting an indication of when the user plans to eat. For example, the prompt may be "When do you plan on eating?" or something to that effect. For the convenience of the user, the AP application may output via the graphical user interface several choices for selection by the user, such as "Now," "In X time," or "In Y time," or the like. The "X time" and "Y time" may be predetermined times, such as 15, 30, 45 or the like, that are in units of minutes or hours. Depending upon which prompt is selected, the AP application may take, for example, one of three actions at 131-135 with respect to delaying delivery of a bolus dosage related to the meal. In the example of FIG. 1, the AP application may in response to receipt of a relative time of ingestion of the meal set a delay parameter. For example, the AP application may receive a relative time indication of "Now," via an input to graphical user interface, and in response the delay parameter may be set by the AP application to a zero time delay (131). Alternatively, in response to a "X time" being selected, the AP application set a delay parameter equal to the time represented by "X time" (133). As a further alternative, the AP application set a delay parameter equal to the time represented by "Y time" in response to the selection of the "Y time" prompt (135). The delay parameter setting may be an amount of time that the AP application may either generate instructions for or that is included in instructions to an automated medical device or drug delivery device to deliver a meal bolus.

The broadest category in which the user may report meal size while still maintaining granularity is by announcing whether the meal is "fast absorbing" or "slow absorbing" through a simplified meal button or "small," "medium," or "large" on a sliding scale. In an example, a slider or any number of indicators can be used instead of a meal button. The meal size and composition can either be detected, or announced by user via an input device, in a coarse form. For example, after the AP application sets a delay parameter at one of 131, 133 or 135, the AP application may at 140 generate a prompt inquiring as to "what type of meal" the user is eating. The inquiry at 140 enables the AP application to determine whether the delay parameter needs to be extended for additional time depending on the type of meal. The type of meal may refer to the general composition of the meal, where composition may be broadly described as "low fat," "high fat," "standard," or the like. For example, the AP application may, in response to receipt of a general composition indication of the meal, determine a setting for an extend parameter. For example, if the meal is a "high fat" meal (e.g., a meal with a large amount of processed ingredients, a fast food hamburger or the like), the graphical user interface may enable an input indicating the meal is a "high fat" meal. The AP application in response to receiving a "high fat" meal indication, may set the extend parameter to ON (151). In addition to the "high fat" meal prompt, the AP application may be operable to generate a "standard" meal prompt on the graphical user interface. In response to an input indicating the "standard" meal prompt was selected instead of the "high fat" meal prompt, the AP application may set the extend parameter to OFF (153).

The extend parameter may be an additional model parameter that may be set to a numerical value to indicate when the user's blood glucose measurement values are expected to begin showing the user's reaction to ingesting the carbohydrates associated with the indicated meal. The extend parameter may be a further time delay in addition to delay parameter set at one of steps 131, 133 or 135. In an example, the extend parameter may be varied in cases of meals with similar carbohydrate but different fat or protein contents, which may impact the absorption rate of the meals and thus the rate of appearance of the impact of the carbohydrates.

After setting the extend parameter at either 151 or 153, the process 100 proceeds to 160. At 160, the AP application may be operable to generate a prompt via the graphical user interface that inquires as the size of the meal. For example, after a response to the prompt requesting an indication of a type of meal at 140, the graphical user interface may present another prompt inquiring as to "how large of a meal is it?" at 160. Of course, how "large" a meal is relative to each user so the AP application may use historical settings customized to the respective user when setting model parameters. The graphical user interface may present optional user interactive devices, such as buttons or a slider, that enable a user to input a size of the meal as small, medium or large.

In the example, the AP application may determine a setting for a delivery constraint based on a coarse indication of the size of the meal received in response to the query at 160. For example, the input at 171 may be an indication that the meal was "large," the AP application may be operable to set the delivery constraint to "very relaxed." While, in response to the AP application receiving an indication that the meal was "medium," the AP application may be operable to set the delivery constraint to "relaxed" (173). The AP application may be operable to set the delivery constraint to "typical" (175). The delivery constraint may, for example, be a maximum level of insulin that may be delivered in a given time period, such as a mealtime bolus, an amount of insulin equal to total daily insulin quantity, or the like. The delivery constraint may be implemented for the safety of the user to prevent an overdose of insulin, which may result in hypoglycemia or hyperglycemia. In the example, the "relaxation" of the delivery constraint may be an increase in the amount of insulin that may be delivered to compensate for the ingestion of the size of the meal indicated by either the large, medium or small meal identification. In an example, in response to an indication at 160 of a large meal being eaten, the model implemented by the AP application may calculate a bolus insulin dosage that may be close to, or may exceed, a delivery constraint for a maximum daily dosage of insulin to be delivered. As a result of the calculated bolus insulin dosage being close to the delivery constraint, the AP application may increase the maximum daily dosage a fixed percentage (i.e., relax the safety constraint) that is commensurate with the ingestion of a large meal.

The AP application at 180 may be operable to modify selected meal model using the determined setting for the delivery parameter, the determined setting for the delay parameter, and the determined setting for the delivery constraint, and utilize the modified, selected meal model to determine a dose of insulin to be delivered in response to the received information. For example, the determined settings for the delay parameter, the extend parameter and the delivery constraint may be used by the AP application in a calculation of an amount (or dosage) of insulin to be delivered as a meal bolus. The AP application may be operable to generate instructions and output the generated instructions to an automated medical device, such as a pod or other drug delivery device instructing delivery of the meal bolus at a predetermined time. Alternatively, the AP application may be operable to generate a presentation of the calculated insulin dosage on a graphical user interface of a computing device. For example, the AP application may provide the presentation of the calculated insulin dosage to allow a user to self-deliver the meal bolus as in an open-loop system.

In addition, the AP application when cooperating with an automated medical device, may wait for a period of time based, for example, on the delay parameter setting (which was set at one of 131, 133 or 135). During the period of time (i.e., the delay) in delivering the meal bolus, the AP application may request confirmation of previously selected inputs, such as those provided at 131, 133, 135, 151, 153, 171, 173 or 175. In addition, the AP application may allow a user to update parameters any time during a meal (190). For example, the user may change their mind during a meal and modify the chosen meal, decide not to eat as much, the like after inputting information at steps 131, 133, 135, 151, 153, 171, 173 or 175.

Figure 2:
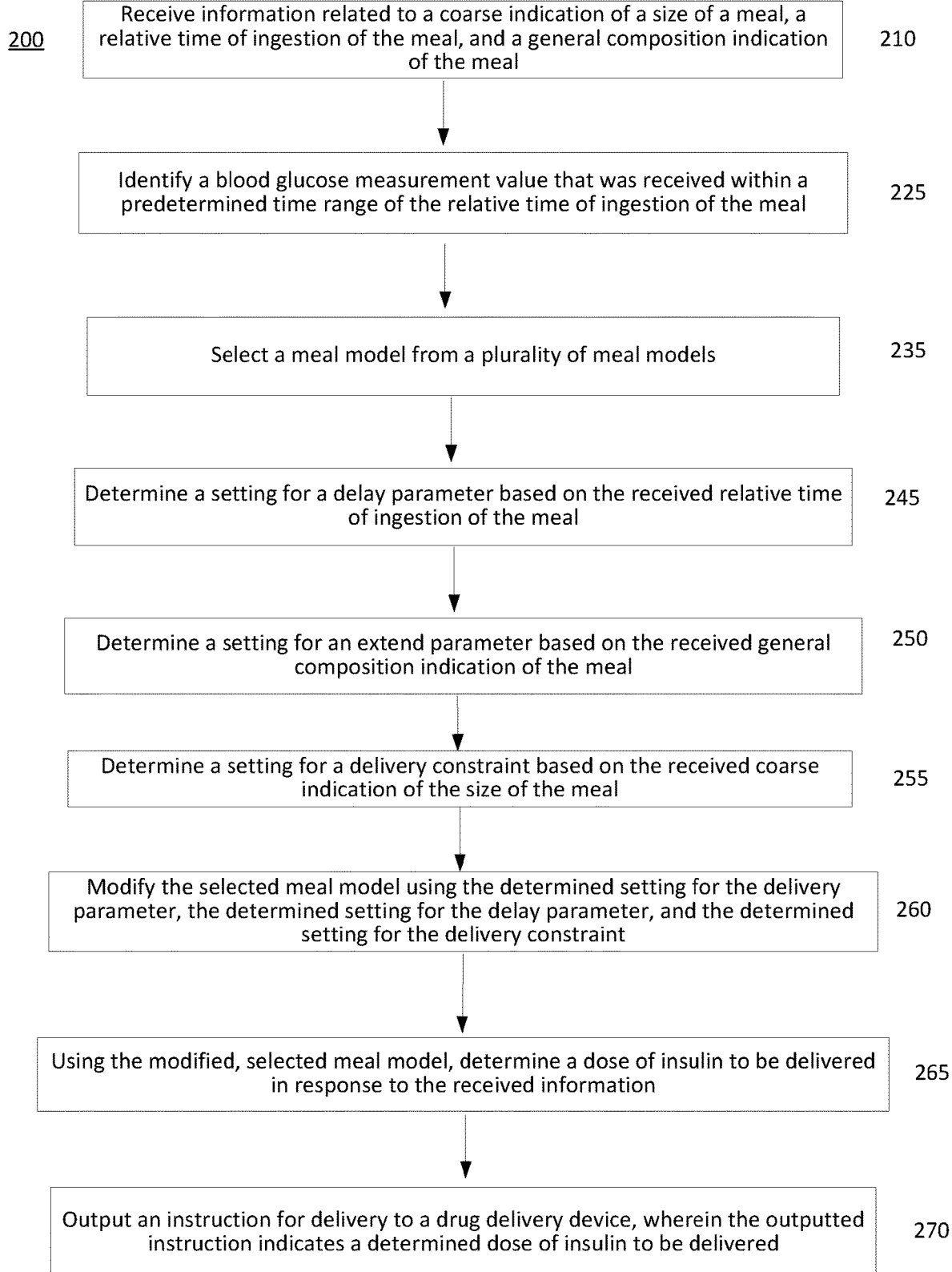
FIG. 2 illustrates another flowchart of an example process implemented by an artificial pancreas application using the techniques described in the example of FIG. 1.

FIG. 2 illustrates another flowchart of an example process implemented by an artificial pancreas application using the techniques described in the example of FIG. 1.

In the example process 200, the AP application may be operable to receive information related to ingestion of a meal, wherein the information includes a coarse indication of a size of the meal, a relative time of ingestion of the meal, and a general composition indication of the meal (210). For example, the AP application may be operable to receive the information relate to ingestion of the meal from a user interface such as a graphical user interface, a keyboard, a microphone, a camera or the like. The AP application, in response to receiving the information, may identify a blood glucose measurement value that was received within a predetermined time range of the relative time of ingestion of the meal (225).

In the example, the AP application select a meal model from a number of meal models (235). To explain in more detail, a number of meal models may be stored in a memory accessible by the AP application. A meal model may be an algorithm having a number of parameters. For example, the AP application may monitor and develop known metrics related to the user's diabetes, such as their Hemoglobin A1c (HbA1c), a standard clinical method to assess the user's quality of glucose control over the previous 2-3 months, and % times in safe glycemic range, which is a measure to determine how much of their daily diabetes care the users' glucose concentrations remain in the approximately 70-180 mg/dL range that is between the hyperglycemic and hypoglycemic thresholds. The AP application may also specifically monitor and recommend the user's known clinical parameters related to diabetes, such as Total Daily Insulin (TDI), Insulin Onboard (IOB), Correction Factor, and Carbohydrate Ratio. The parameters may also be based on a number of inputs to the AP application that receive data related to a user associated with the AP application. The received data a historical profile of the user, a history of the user's insulin treatment, a history of the user's blood glucose measurement values and the like may be stored in a memory accessible by the AP application. The meal model used by the AP application may be a default algorithm when initially installed on a portable computing device but may develop into a customized algorithm after use by the user for a period of time. Alternatively, the meal model may be selected based on a blood glucose measurement that is identified as being received within a predetermined time range of the relative time of ingestion of the meal as indicated in the received information. In a further example, as the user continues to use the AP application, the AP application over time may be operable to develop customized parameter settings based performance of the meal model. In addition, there may be several default meal models that are specific to particular meals or times of day. For example, breakfast time meals may have a specific meal model, while dinner time meals may have a different but equally specific meal model. Other meal models may include a snack meal model, a lunch meal model, a rescue meal model, an exercise meal model or the like.

In the example of FIG. 2, the AP application may be further operable to determine a setting for a delay parameter based on the received relative time of ingestion of the meal (245). For example, the AP application may be operable to receive an input indicating the setting for the delay parameter and, based on the received input, may set the delay parameter in the selected meal model to a numeric value that corresponds to the received relative time of ingestion of the meal.

The AP application may be further operable to determine a setting for an extend parameter based on the received general composition indication of the meal. For example; using the received input indicating the general composition of the meal, the AP application may set the extend parameter to a numeric value based on the general composition of the meal (250).

At 255, the AP application may be operable to determine a setting for a delivery constraint based on the received coarse indication of the size of the meal. In an example, the AP application may receive, via a user interface or the like of the computing device, an input indicating the setting for the delivery constraint. Based on the received input, the AP application may set the delivery constraint to a numeric value. In a specific example, the AP application may determine the received input indicating the setting for the delivery constraint is an input indicating the ingested meal is a large meal. Based on the input indicating the ingested meal is a large meal, the AP application may be operable to set the delivery constraint to a very relaxed preset percentage above a maximum amount of insulin to be delivered in a day via automated delivery for basal compensation (i.e., basal coverage of total daily insulin (TDI), which is typically 50%). A very relaxed preset percentage above a maximum basal coverage of TDI may be between 40-50 percent, or the like. Alternatively, the AP application may determine the received input indicating the setting for the delivery constraint is an input indicating the ingested meal is a medium meal. Based on the ingested meal being a medium meal, the AP application may set the delivery constraint to a relaxed preset percentage above a maximum amount of insulin to be delivered (i.e., basal coverage of total daily insulin (TDI)). A relaxed preset percentage above a maximum basal coverage of TDI may be between 20-30 percent, or the like. In yet another alternative, the AP application may determine the received input indicating the setting for the delivery constraint is an input indicating the ingested meal is a small meal. Based on the input indicating the ingested meal is a small meal, the AP application may be operable to set the delivery constraint to a typical preset percentage above a maximum amount of insulin to be delivered (i.e., basal coverage of total daily insulin (TDI)). A typical preset percentage above a maximum basal coverage of TDI may be between 0-20 percent, or the like.

Upon setting of the respective parameters for extend, delay and delivery constraints, the AP application may modify the selected meal model using the determined setting for the delay parameter, the determined setting for the extend parameter, and the determined setting for the delivery constraint (260).

The model itself may include increased insulin delivery as a reaction to increasing blood glucose measurement values that are greater than normal with the knowledge the user had recently eaten. The magnitude of the reaction to the blood glucose measurement values that are allowable may be determined by the sub-model selected and known metrics such as Total Daily Insulin, Correction Factor, and Carbohydrate Ratio. The initial treatment target may also be adjusted to compensate for a larger amount of insulin onboard (IOB) during this period. A determination between an immediate bolus size and an extended bolus size and length may also be determined based on predictions may using the model. Other factors may also be considered such as, for example, whether the user participated in exercise and how recent was the exercise.

The AP application, using the modified, selected meal model, may be operable to determine a dose of insulin to be delivered in response to the received information (265). Upon determining a dose of insulin, the AP application may generate an instruction that indicates a determined dose of insulin to be delivered and, at 270, may output the instruction for delivery to a drug delivery device (shown in another example). The outputted instruction may indicate a determined dose of insulin to be delivered.

In some examples, the AP application may be operable to perform additional functions when selecting the meal model from the number of meal models. For example, the AP application may determine factors usable in limiting the number of meal models for selection from the number of meal models. For example, the AP application may use factors such as a time of day, calendar setting for a day in which the meal is being ingested, a closest match to a meal profile trajectory, user inputs (such as indications of meal composition), or the like. Using the factors, the AP application may be operable to identify meal models from the plurality of meal models that satisfy a greatest number of factors. The AP application may eliminate all meal models from the plurality of meal models except the identified meal models and may choose one of the identified meal models for selection based on a confidence level associated with each of the identified meal models.

The confidence level may be probability score of how correct the AP application is in the identification of the meal being ingested. The confidence score may be based on a number of factors, such as, for example, how accurate the user is responding to the prompts at 120, 140 and 160 of FIG. 1. The user's accuracy may, for example, be determined by evaluating blood glucose measurement values received subsequent to ingestions of the meal or based on the fact the user is not requesting another bolus after receiving a meal-related bolus. If the user is accurate a high percentage of the time based on a user history, the AP application confidence level in the selected meal model may be high. Conversely, if the user is frequently inaccurate, other factors, such as past meal history (i.e., eating large dinner meals at around 6:00 PM every weekday or the like), and corresponding blood glucose measurement values, may be used to determine the confidence level of the respective meal models.

In a further example, prior to modifying the selected meal model, the AP application may receive blood glucose measurement values over a period of time extending from before until after the receipt of the relative time of ingestion of the meal. In the further example, the AP application may be operable to determine a trajectory of the received blood glucose measurement values and compare the determined trajectory to known blood glucose measurement value trajectories related to meals of different compositions. Based on a result of the comparison, the AP application may determine the user accurately described the meal and confirm that the received input indicating the setting for the extend parameter is correct. The AP application may utilize the received input in the determination of the extend parameter based on the confirmation.

Figure 3:
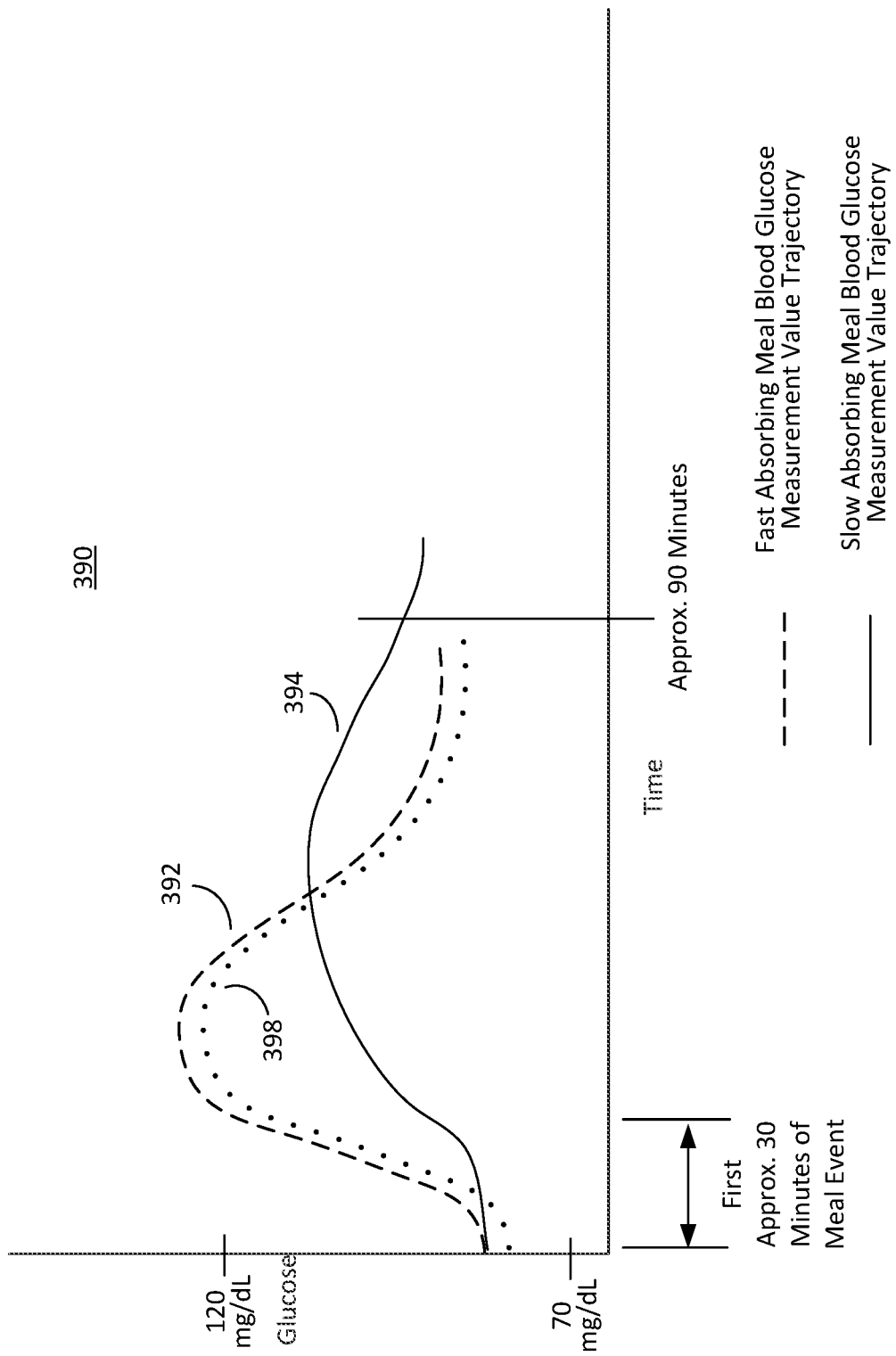
FIG. 3 is graph illustrating blood glucose profiles with respect to high absorbing food and slow absorbing food.

FIG. 3 is graph illustrating blood glucose profiles with respect to high absorbing food and slow absorbing food. In another example, the rate of change of blood glucose measurement values following ingestion of a meal may be utilized to assess a relative composition of meals—for example, blood glucose measurement values with high rates of change may be considered to be the result of a meal with faster absorbing carbohydrates, whereas a relatively flat glucose trend may be considered high fat meals.

Processed foods are quickly absorbed by the body due to the high sugar content of the processed foods so meals containing processed foods, in particular, the carbohydrates in processed foods are considered fast absorbing because of the high sugar content. High fiber and high protein meals are more slowly absorbed by the body. In the example, the graph 390 illustrates a y-axis representing approximate blood glucose measurement values in units of mg/dL and the x-axis is approximate times in minutes. A trajectory of the blood glucose measurement values in response to a fast absorbing (possibly low fat) meal (as represented by trajectory 392) usually rises rapidly (as shown by the dashed line), whereas a trajectory of the blood glucose measurement values in response to a slow absorbing (due to possible high fat content) meal (as represented by trajectory 394) usually rises slowly (as shown by the solid line). The steeper the rise of the trajectory of the blood glucose measurement values the greater the rate of change of the user's blood glucose measurement values. For example, the trajectory 392 rises more rapidly than the trajectory 394.

In FIG. 3, the time bracket below the time axis may, for example, represents the first approximately 30 minutes of time after the ingestion of a meal. The algorithm or AP application may be operable to analyze, for example, the first XX minutes of a blood glucose measurement value trajectory following meal ingestion and determining whether the of blood glucose measurement value is rising rapidly or slowly. In an operational example, an algorithm or AP application may receive blood glucose measurements from a continuous blood glucose monitor or the like. The algorithm or AP application may be operable to receive an initial blood glucose measurement value from a continuous blood glucose monitor or other blood glucose measurement device at a time indicated as an approximate time of ingestion of a meal, for example, the approximate time may be based on a calendar application data, a user's direct input to a meal button, a combination of data such as location data and built-in sensor data, such as a camera image of a restaurant or accelerometer data indicating standing, sitting or casual interaction. The algorithm or AP application may also receive subsequent blood glucose measurement values. The algorithm or AP application may be further operable to analyze the initial and subsequent blood glucose measurement values to determine whether a rate of change of the blood glucose measurement values more closely matches the fast absorbing meal blood glucose measurement value trajectory 392 or a slow absorbing meal blood glucose measurement value trajectory 394. The closeness of the match between the respective rates of change may be determined using, for example, a curve-fitting algorithm or other form of function. For example, the algorithm or AP application may be operable to receive the initial and subsequent blood glucose measurement values and compare the initial and subsequent blood glucose measurement values to reference blood glucose measurement values stored, for example, in memory. Based on the result of the comparison, the algorithm or AP application may determine whether the ingested meal is slow-absorbing or fast absorbing and generate an appropriate response for modifying an insulin treatment plan of the user.

In the specific example of the process 200, the respective trajectories may be used to in the determination of a setting for the extend parameter. For example, during the process 200, the AP application may receive blood glucose measurement values (shown as black dots in the curve 398) over a period of time extending from before until after the receipt of the relative time of ingestion of the meal. The AP application may be operable to determine a trajectory of the received blood glucose measurement values shown as 398. The AP application may compare the determined trajectory to a fast absorbing meal blood glucose measurement value trajectory. Based on a result of the comparison, the AP application may quantify a fast-absorbing similarity value between the determined trajectory and the fast absorbing meal blood glucose measurement value trajectory. The AP application may be further operable to compare the determined trajectory to a slow absorbing meal blood glucose measurement value trajectory and, based on a result of the comparison, may quantify a slow-absorbing similarity between the determined trajectory and the slow absorbing meal blood glucose measurement value trajectory. The AP application may be operable to determine which of the quantified fast-absorbing similarity and the quantified slow-absorbing similarity has a highest similarity value. Based on the highest similarity value, the AP application may determine whether the fast absorbing meal blood glucose measurement value trajectory or the slow absorbing meal blood glucose measurement value trajectory is most similar to the determined trajectory. As a result of the determination of the most similar to the determined trajectory, the AP application may be operable to use the result of the determination (i.e. which of the fast absorbing meal blood glucose measurement value trajectory or the slow absorbing meal blood glucose measurement value trajectory is most similar) based on the highest similarity value in the further determination of the extend parameter. For example, the determination of the extend parameter may be a fixed value that is an ON or OFF determination depending upon which of the quantified fast-absorbing similarity or the quantified slow-absorbing similarity has a highest similarity value.

In the examples of FIGS. 1-3, the example processes may be implemented by programming code, such as an AP application or an algorithm, that is executed by a processor. The AP application or algorithm when executed by a processor may utilize inputs and calculations as described with respect to the foregoing examples.

Figure 4:
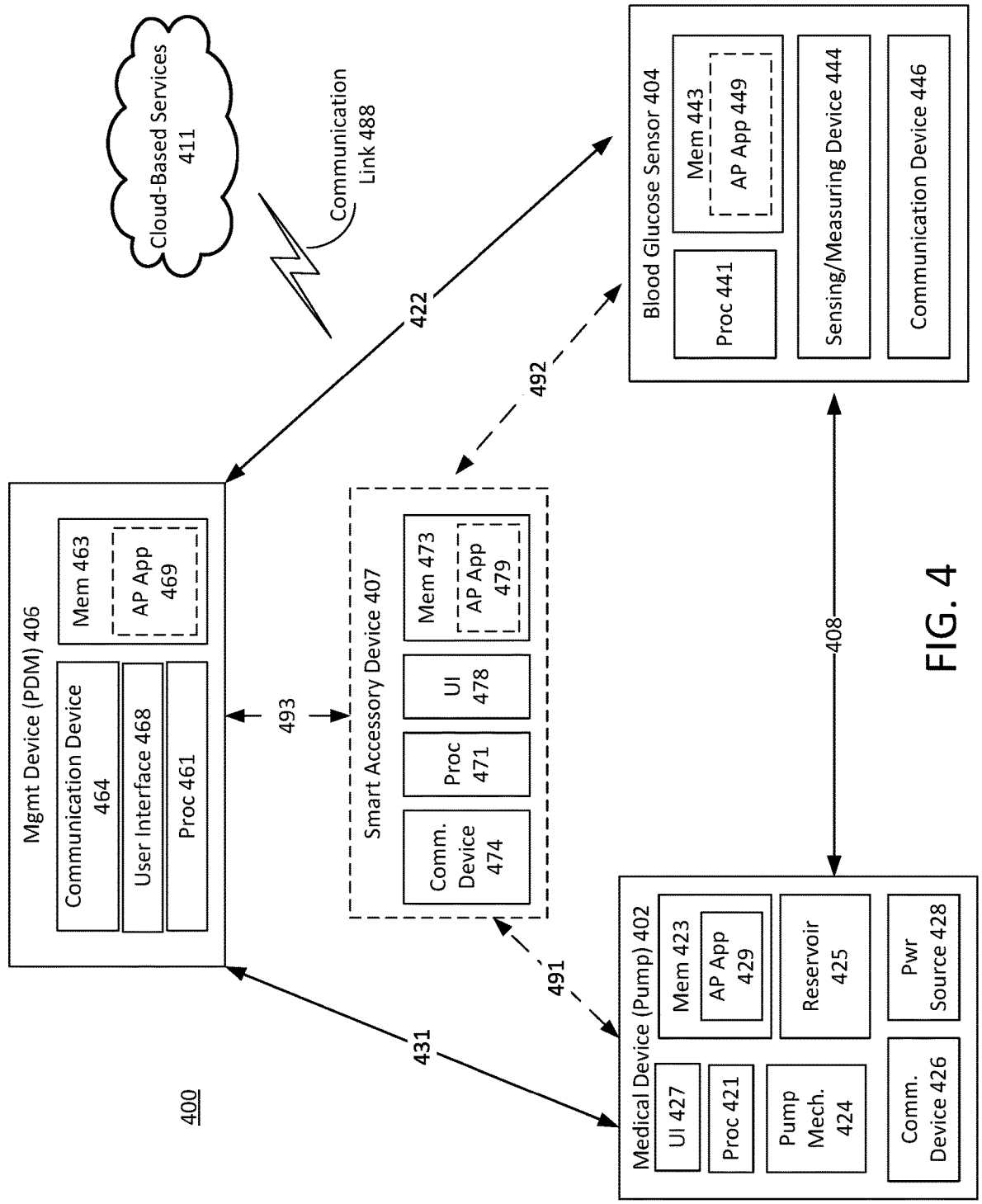
FIG. 4 illustrates a functional block diagram of a drug delivery system suitable for implementing the example processes and techniques described herein.

It may be helpful to discuss an example of a drug delivery system that may implement the process example of FIGS. 1-3. FIG. 4 illustrates an example of a drug delivery system 400.

The drug delivery system 400 may be operable to implement the process examples illustrated in FIGS. 1-3 by executing an AP application or algorithm that includes functionality related to receiving information related to ingestion of a meal. The information may include a coarse indication of a size of the meal, a relative time of ingestion of the meal, and a general composition indication of the meal. A blood glucose measurement value may be received within a predetermined time range of a relative time of ingestion of the meal. Settings for a delay and an extend parameter and a delivery constraint may be determined. A meal model may be modified using the determined settings for the delay parameter, the extend parameter, and the delivery constraint. The modified meal model may be used to determine a dose of insulin to be delivered in response to the received information. An instruction indicates a determined dose of insulin to be delivered may be output for delivery to a drug delivery device.

The drug delivery system 400 may be an automated drug delivery system that may include a medical device (pump) 402 (also referred to as "a drug delivery device" or "a wearable drug delivery device"), a blood glucose sensor 404 (also referred to as "a continuous glucose monitor" or "a blood glucose measurement device"), and a management device (PDM) 406. The system 400, in an example, may also include a smart accessory device 407, which may be operable to communicate with the other components of system 400 either via a wired or wireless communication link, such as 491, 492 or 493.

In an example, the medical device 402 may be attached to the body of a user, such as a patient or diabetic, and may deliver any therapeutic agent, including any drug or medicine, such as insulin, morphine or the like, to the user. The medical device 402 may, for example, be a wearable device worn by the user. For example, the medical device 402 may be directly coupled to a user (e.g., directly attached to a body part and/or skin of the user via an adhesive or the like). In an example, a surface of the medical device 402 may include an adhesive (not shown) to facilitate attachment to a user.

The medical device 402 may include a number of components to facilitate automated delivery of a drug (also referred to as a therapeutic agent) to the user. The medical device 402 may be operable to store the drug (i.e., insulin) and to provide the drug to the user. The medical device 402 is often referred to as a pump, or an insulin pump, in reference to the operation of expelling insulin from the reservoir 425 for delivery to the user. While the examples refer to the reservoir 425 storing insulin, the reservoir 425 may be operable to store other drugs or therapeutic agents, such as morphine or the like, that are suitable for automated delivery.

In various examples, the medical device 402 may be an automated, wearable drug delivery device. For example, the medical device 402 may include a reservoir 425 for storing the drug (such as insulin), a needle or cannula (not shown) for delivering the drug into the body of the user (which may be done subcutaneously, intraperitoneally, or intravenously), and a pump mechanism (mech.) 424, or other drive mechanism, for transferring the drug from the reservoir 425, through a needle or cannula (not shown), and into the user. The pump mechanism 424 may be fluidly coupled to reservoir 425, and communicatively coupled to the medical device processor 421. The medical device 402 may also include a power source 428, such as a battery, a piezoelectric device, or the like, for supplying electrical power to the pump mechanism 424 and/or other components (such as the processor 421, memory 423, and the communication device 426) of the medical device 402. Although not shown, an electrical power supply for supplying electrical power may similarly be included in each of the sensor 404, the smart accessory device 407 and the management device (PDM) 406.

The blood glucose sensor 404 may be a device communicatively coupled to the processor 461 or 421 and may be operable to measure a blood glucose value at a predetermined time intervals, such as every 5 minutes, or the like. The blood glucose sensor 404 may provide a number of blood glucose measurement values to the AP applications operating on the respective devices (e.g., 429, 449, 469, or 479) at predetermined time intervals, such as every 5 minutes or the like.

The medical device 402 may provide the insulin stored in reservoir 425 to the user based on information (e.g., blood glucose measurement values, predicted future blood glucose measurements, evaluations based on a user request for a bolus, an user interaction with PDM 406, medical device 402, sensor 404 or smart accessory device 407), evaluations of missing blood glucose measurements and the other information provided by the sensor 404, smart accessory device 407, and/or the management device (PDM) 406. For example, the medical device 402 may receive instruction outputted by the AP application 469 (479 or 449) that indicate a determined dose of insulin to be delivered and in response to the received instruction may deliver the determined dose of insulin to the user.

In an example, the medical device 402 may contain analog and/or digital circuitry that may be implemented as a processor 421 (or controller) for controlling the delivery of the drug or therapeutic agent. The circuitry used to implement the processor 421 may include discrete, specialized logic and/or components, an application-specific integrated circuit, a microcontroller or processor that executes software instructions, firmware, programming instructions or programming code (enabling, for example, the artificial pancreas application (AP App) 429 as well as the process examples of FIGS. 1-3) stored in memory 423, or any combination thereof. For example, the processor 421 may execute a control algorithm, such as an artificial pancreas application 429, and other programming code that may make the processor 421 operable to cause the pump to deliver doses of the drug or therapeutic agent to a user at predetermined intervals or as needed to bring blood glucose measurement values to a target blood glucose value. In an example, the AP application (App) 429 may include programming code that is operable upon execution by the processor 421 to provide the example processes for adjusting or modifying duration of insulin action settings, confidence values, insulin delivery settings, storing blood glucose measurement values in memory, or the like as described with reference to FIGS. 1-3. The size and/or timing of the doses may be programmed, for example, into an artificial pancreas application 429 by the user or by a third party (such as a health care provider, medical device manufacturer, or the like) using a wired or wireless communication link, such as 431, between the medical device 402 and a management device 406 or other device, such as a computing device at a healthcare provider facility. In an example, the pump or medical device 402 is communicatively coupled to the processor 461 of the management device via the wireless communication link 431 or via a wireless communication link, such as 491 from smart accessory device 407 or 408 from the sensor 404. The pump mechanism 424 of the medical device 402 may be operable to receive an actuation signal from the processor 461, and in response to receiving a command signal or actuation signal, expel insulin from the reservoir 425 based on the evaluations and process steps performed in the process examples of FIGS. 1-3.

In an operational example, the AP application 469 may be executing in the management device 406 and control delivery of insulin. For example, the AP application 469 may be operable to determine timing of an insulin dose and may output a command signal to the medical device 402 that actuates the pump mechanism 424 to deliver insulin dose based on the evaluations and process steps performed in the process examples of FIGS. 1-3.

The other devices in the system 400, such as management device 406, smart accessory device 407 and sensor 404, may also be operable to perform various functions including controlling the medical device 402. For example, the management device 406 may include a communication device 464, a processor 461, and a management device memory 463. The management device memory 463 may store an instance of the AP application 469 that includes programming code, that when executed by the processor 461 provides the process examples described with reference to the examples of FIGS. 1-3. The management device memory 463 may also store programming code for providing the process examples described with reference to the examples of FIGS. 1-3.

The smart accessory device 407 may be, for example, an Apple Watch®, other wearable smart device, including eyeglasses, provided by other manufacturers, a global positioning system-enabled wearable, a wearable fitness device, smart clothing, or the like. Similar to the management device 406, the smart accessory device 407 may also be operable to perform various functions including controlling the medical device 402. For example, the smart accessory device 407 may include a communication device 474, a processor 471, and a memory 473. The memory 473 may store an instance of the AP application 479 that includes programming code for providing the process examples described with reference to the examples of FIGS. 1 and 2. The memory 473 may also as store programming code and be operable to store data related to the AP application 479. The sensor 404 of system 400 may be a continuous glucose monitor (CGM) as described above, that may include a processor 441, a memory 443, a sensing or measuring device 444, and a communication device 346. The memory 443 may, for example, store an instance of an AP application 449 as well as other programming code and be operable to store data related to the AP application 449 and process examples described with reference to FIGS. 1-3. The AP application 449 may also include programming code for providing the process examples described with reference to the examples of FIGS. 1-3.

Instructions for determining the delivery of the drug or therapeutic agent (e.g., as a bolus dosage) to the user (e.g., the size and/or timing of any doses of the drug or therapeutic agent) may originate locally by the medical device 402 or may originate remotely and be provided to the medical device 402. In an example of a local determination of drug or therapeutic agent delivery, programming instructions, such as an instance of the artificial pancreas application 429, stored in the memory 423 that is coupled to the medical device 402 may be used to make determinations by the medical device 402. In addition, the medical device 402 may be operable to communicate with the cloud-based services 411 via the communication device 426 and the communication link 488.

Alternatively, the remote instructions may be provided to the medical device 402 over a wired or wireless communication link (such as 431) by the management device (PDM) 406, which has a processor 461 that executes an instance of the artificial pancreas application 469, or the smart accessory device 407 (via communication link 491), which has a processor 471 that executes an instance of the artificial pancreas application 469 as well as other programming code for controlling various devices, such as the medical device 402, smart accessory device 407 and/or sensor 404. The medical device 402 may execute any received instructions (originating internally or from the management device 406) for the delivery of the drug or therapeutic agent to the user. In this way, the delivery of the drug or therapeutic agent to a user may be automated.

In various examples, the medical device 402 may communicate via a wireless communication link 431 with the management device 406. The management device 406 may be an electronic device such as, for example, a smart phone, a tablet, a dedicated diabetes therapy management device, or the like. The management device 406 may be a wearable wireless accessory device. The wireless communication links 408, 431, 422, 491, 492 and 493 may be any type of wireless communication link provided by any known wireless standard. As an example, the wireless communication links 408, 431, 422, 491, 492 and 493 may enable communications between the medical device 402, the management device 406 and sensor 404 based on, for example, Bluetooth®, Wi-Fi®, a near-field communication standard, a cellular standard, or any other wireless optical or radio-frequency protocol.

The sensor 404 may be a glucose sensor operable to measure blood glucose and output a blood glucose value or data that is representative of a blood glucose value. For example, the sensor 404 may be a glucose monitor or a continuous glucose monitor (CGM). The sensor 404 may include a processor 441, a memory 443, a sensing/measuring device 444, and communication device 446. The communication device 446 of sensor 404 may include one or more sensing elements, an electronic transmitter, receiver, and/or transceiver for communicating with the management device 406 over a wireless communication link 422 or with medical device 402 over the link 408. The sensing/measuring device 444 may include one or more sensing elements, such as a glucose measurement, heart rate monitor, or the like. The processor 441 may include discrete, specialized logic and/or components, an application-specific integrated circuit, a microcontroller or processor that executes software instructions, firmware, programming instructions stored in memory (such as memory 443), or any combination thereof. For example, the memory 443 may store an instance of an AP application 449 that is executable by the processor 441.

Although the sensor 404 is depicted as separate from the medical device 402, in various examples, the sensor 404 and medical device 402 may be incorporated into the same unit. That is, in various examples, the sensor 404 may be a part of the medical device 402 and contained within the same housing of the medical device 402 (e.g., the sensor 404 may be positioned within or embedded within the medical device 402). Glucose monitoring data (e.g., measured blood glucose values) determined by the sensor 404 may be provided to the medical device 402, smart accessory device 407 and/or the management device 406 and may be used to perform the functions and deliver doses of insulin for automated delivery of insulin by the medical device 402 as described with reference to the examples of FIGS. 1-3.

The sensor 404 may also be coupled to the user by, for example, adhesive or the like and may provide information or data on one or more medical conditions and/or physical attributes of the user. The information or data provided by the sensor 404 may be used to adjust drug delivery operations of the medical device 402.

In an example, the management device 406 may be a computing device operable to manage a personal diabetes treatment plan via an AP application or an algorithm. The management device 406 may be used to program or adjust operation of the medical device 402 and/or the sensor 404. The management device 406 may be any portable electronic, computing device including, for example, a dedicated controller, such as processor 461, a smartphone, or a tablet. In an example, the management device (PDM) 406 may include a processor 461, a management device management device memory 463, and a communication device 464. The management device 406 may contain analog and/or digital circuitry that may be implemented as a processor 461 (or controller) for executing processes to manage a user's blood glucose levels and for controlling the delivery of the drug or therapeutic agent to the user. The processor 461 may also be operable to execute programming code stored in the management device management device memory 463. For example, the management device management device memory 463 may be operable to store an artificial pancreas (AP) application 469 that may be executed by the processor 461. The processor 461 may when executing the artificial pancreas application 469 may be operable to perform various functions, such as those described with respect to the examples in FIGS. 1-3. The communication device 464 may be a receiver, a transmitter, or a transceiver that operates according to one or more radio-frequency protocols. For example, the communication device 464 may include a cellular transceiver and a Bluetooth transceiver that enables the management device 406 to communicate with a data network via the cellular transceiver and with the sensor 404 and the medical device 402. The respective transceivers of communication device 464 may be operable to transmit signals containing information useable by or generated by the AP application or the like. The communication devices 426, 446 and 476 of respective medical device 402, sensor 404 and smart accessory device 407 may also be operable to transmit signals containing information useable by or generated by the AP application or the like.

The medical device 402 may communicate with the sensor 404 over a wireless communication link 408 and may communicate with the management device 406 over a wireless communication link 431. The sensor 404 and the management device 406 may communicate over a wireless communication link 422. The smart accessory device 407, when present, may communicate with the medical device 402, the sensor 404 and the management device 406 over wireless communication links 491, 492 and 493, respectively. The wireless communication links 408, 431, 422, 491, 492 and 493 may be any type of wireless communication link operating using known wireless standards or proprietary standards. As an example, the wireless communication links 408, 431, 422, 491, 492 and 493 may provide communication links based on Bluetooth®, Wi-Fi, a near-field communication standard, a cellular standard, or any other wireless protocol via the respective communication devices 426, 446 and 464. In some examples, the medical device 402 and/or the management device 406 may include a user interface 427, 478 and 468, respectively, such as a keypad, a touchscreen display, levers, buttons, a microphone, a speaker, a display, or the like, that is operable to allow a user to enter information and allow the management device to output information for presentation to the user. One of many examples of a user interface, such as 427, 478 or 468, suitable for use in implementing the techniques described herein is described below with reference to FIG. 5.

In various examples, the drug delivery system 400 may implement the artificial pancreas (AP) algorithm (and/or provide AP functionality) to govern or control automated delivery of insulin to a user (e.g., to maintain euglycemia-a normal level of glucose in the blood). The AP application may be implemented by the medical device 402 and/or the sensor 404. The AP application, in addition to the processes described with reference to the examples of FIGS. 1-3, may be used to determine the times and dosages of insulin delivery. In various examples, the AP application may determine the times and dosages for delivery based on information known about the user, such as the user's sex, age, weight, or height, and/or on information gathered about a physical attribute or condition of the user (e.g., from the sensor 404). For example, the AP application may determine an appropriate delivery of insulin based on glucose level monitoring of the user through the sensor 404. The AP application may also allow the user to adjust insulin delivery. For example, the AP application may allow the user to issue (e.g., via an input) commands to the medical device 402, such as a command to deliver an insulin bolus. In some examples, different functions of the AP application may be distributed among two or more of the management device 406, the medical device (pump) 402 or the sensor 404. In other examples, the different functions of the AP application may be performed by one device, such the management device 406, the medical device (pump) 402 or the sensor 404.

In an example of a hardware implementation of a real-time meal model adjustment, the example processes, such as those described with reference to FIGS. 1-3 above may be implemented on a blood glucose sensor 404. The blood glucose sensor 404 may, for example, be a continuous blood glucose monitor (CGM) that may be operable via AP application 449 to receive insulin delivery information from a personal diabetes management device 406.

As described herein, the drug delivery system 400 or any component thereof, such as the medical device may be considered to provide AP functionality or to implement an AP application. Accordingly, references to the AP application (e.g., functionality, operations, or capabilities thereof) are made for convenience and may refer to and/or include operations and/or functionalities of the drug delivery system 400 or any constituent component thereof (e.g., the medical device 402 and/or the management device 406). The drug delivery system 400—for example, as an insulin delivery system implementing an AP application—may be considered to be a drug delivery system or an AP application-based delivery system that uses sensor inputs (e.g., data collected by the sensor 404).

In an example, one or more of the devices, 402, 404, 406 or 407 may be operable to communicate via a wireless communication link 488 with cloud-based services 411. The cloud-based services 411 may utilize servers and data storage (not shown). The communication link 488 may be a cellular link, a Wi-Fi link, a Bluetooth link, or a combination thereof, that is established between the respective devices 402, 404, 406 or 407 of system 400. The data storage provided by the cloud-based services 411 may store anonymized data, such as user weight, blood glucose measurements, age, meal carbohydrate information, or the like. In addition, the cloud-based services 411 may process the anonymized data from multiple users to provide generalized information related to the various parameters used by the AP application. For example, an age-based general target blood glucose value may be derived from the anonymized data, which may be helpful in selection of a meal model from the number of meal models available for selection while using a system such as 400. The cloud-based services 411 may also provide processing services for the system 400, such as performing the process 100 in the example of FIG. 1 or additional processes, such as those described with reference to FIGS. 2 and 3.

In an example, the device 402 includes a communication device 464, which as described above may be a receiver, a transmitter, or a transceiver that operates according to one or more radio-frequency protocols, such as Bluetooth, Wi-Fi, a near-field communication standard, a cellular standard, that may enable the respective device to communicate with the cloud-based services 411. For example, outputs from the sensor 404 or the medical device (pump) 402 may be transmitted to the cloud-based services 411 for storage or processing via the transceivers of communication device 464. Similarly, medical device 402, management device 406 and sensor 404 may be operable to communicate with the cloud-based services 411 via the communication link 488.

In an example, the respective receiver or transceiver of each respective device, 402, 406 or 407, may be operable to receive signals containing respective blood glucose measurement values of the number of blood glucose measurement values that may be transmitted by the sensor 404. The respective processor of each respective device 402, 406 or 407 may be operable to store each of the respective blood glucose measurement values in a respective memory, such as 423, 463 or 473. The respective blood glucose measurement values may be stored as data related to the artificial pancreas algorithm, such as 429, 449, 469 or 479. In a further example, the AP application operating on any of the management device 406, the smart accessory device 407, or sensor 404 may be operable to transmit, via a transceiver implemented by a respective communication device, 464, 474, 446, a control signal for receipt by a medical device. In the example, the control signal may indicate an amount of insulin to be expelled by the medical device 402.

Various operational scenarios and examples of processes performed by the system 400 are described herein. For example, the system 400 may be operable to implement the process examples of FIGS. 1-3 and user interface and graphical user interface example of FIG. 5, which is described below.

The techniques described herein for providing functionality to may be implemented using a number of different approaches. For example, the system 400 or any component thereof may be implemented in hardware, software, or any combination thereof. Software related implementations of the techniques described herein may include, but are not limited to, firmware, application specific software, or any other type of computer readable instructions that may be executed by one or more processors. Hardware related implementations of the techniques described herein may include, but are not limited to, integrated circuits (ICs), application specific ICs (ASICs), field programmable arrays (FPGAs), and/or programmable logic devices (PLDs). In some examples, the techniques described herein, and/or any system or constituent component described herein may be implemented with a processor executing computer readable instructions stored on one or more memory components.

Figure 5:
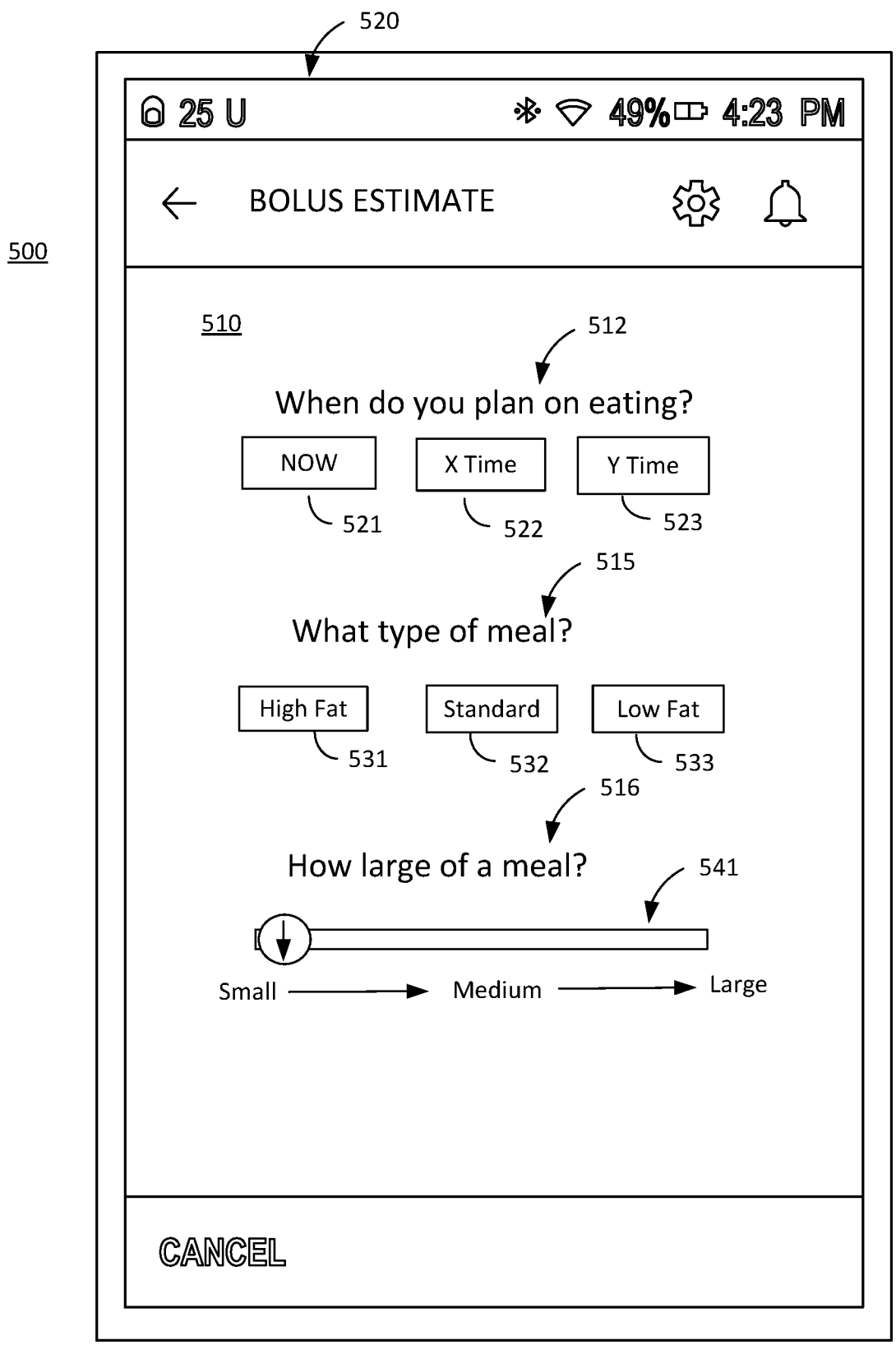
FIG. 5 illustrates an example of a graphical user interface presented on a user interface as described with reference to the examples of FIGS. 1-4.

FIG. 5 illustrates an example of a graphical user interface presented on a user interface as described with reference to the examples of FIGS. 1-4.

The user interface 520 may be presented on a computing device such as smartphone, a personal diabetes management device, a tablet or a wearable electronic device, such as a smartwatch or the like. In addition to providing other information related to diabetes management, the user interface 520 may also include a graphical user interface 510 that includes prompts for information useful in calculating a bolus dosage. The user interface 520 may be for example a touchscreen display that is operable in response to commands from a computing device processor (shown in other examples) to present prompts and input icons. For example, the prompts, such as 512, 515 and 516, may present the queries described with reference to FIG. 1 above. For example, the prompt 512 enables an input indicating a relative time of ingestion of the meal. In the example, the prompt 512 may be "when do you plan on eating?" and the input icons (521-523) may present the responses of "NOW," (521) "X time" (522) or "Y time" (523). The prompt 515 may enable an input indicating a general composition indication of the meal. For example, the prompt 515 may be, for example, the query "What type of meal?" The input icons 531, 532 and 533 may, respectively, be "High Fat," "Standard" and "Low Fat" or the like may be presented. A further query may be a request for an indication of the size of the meal. For example, the prompt may be a query of "how large of a meal?" The input icon may be replaced with a slider input 541 that indicates a coarse indication of a size of a meal by providing a range of meal size indications from "Small" to "Large" with "Medium" being in between Small and Large. The illustrated example of the user interface 520 and the graphical user interface 510 are shown for purposes of illustration and are not shown to limit the user interface 520 or graphical user interface 510 to these specific examples. Of course, the user interface 520 may present hard buttons as opposed to the soft buttons of the input icons 521-523, for example. Other alternative input mechanisms and devices may also be considered as described herein.

Alternatively, the graphical user interface 510 may present a simple meal button (e.g., meal indicator and the time of day, if the user is consistent with the size and types of meals eaten) that may associate different meal models within the algorithm or AP application to improve post prandial control while reducing user burden.

In addition, or alternatively, while the examples may have been described with reference to a closed loop algorithmic implementation of an AP application or an algorithm, variations of the disclosed examples may be implemented to enable open loop use. The open loop implementations allow for use of different modalities of delivery of insulin such as smart pen, syringe or the like, with the trigger of the initiation of insulin deliveries being the user, rather than an automated algorithm. For example, the disclosed AP application and algorithms may be operable to perform various functions related to open loop operations, such as outputting an instruction including a determined dose of insulin to be delivered to a user that presents via a user interface the determined dose of insulin. Other open-loop actions may also be implemented by adjusting user settings or the like in an AP application or algorithm.

Some examples of the disclosed device may be implemented, for example, using a storage medium, a computer-readable medium, or an article of manufacture which may store an instruction or a set of instructions that, if executed by a machine (i.e., processor or microcontroller), may cause the machine to perform a method and/or operation in accordance with examples of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, programming code, and the like, implemented using any suitable high-level, low-level, object-oriented, visual, compiled and/or interpreted programming language. The non-transitory computer readable medium embodied programming code may cause a processor when executing the programming code to perform functions, such as those described herein.

Certain examples of the present disclosure were described above. It is, however, expressly noted that the present disclosure is not limited to those examples, but rather the intention is that additions and modifications to what was expressly described herein are also included within the scope of the disclosed examples. Moreover, it is to be understood that the features of the various examples described herein were not mutually exclusive and may exist in various combinations and permutations, even if such combinations or permutations were not made express herein, without departing from the spirit and scope of the disclosed examples. In fact, variations, modifications, and other implementations of what was described herein will occur to those of ordinary skill in the art without departing from the spirit and the scope of the disclosed examples. As such, the disclosed examples are not to be defined only by the preceding illustrative description.

Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of example examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A non-transitory computer readable medium embodied with programming code executable by one or more processors of a drug delivery system that includes a drug delivery device with a reservoir of a drug, wherein the one or more processors when executing the programming code is/are operable to perform functions, including functions to:

display on a display device a plurality of options for a coarse indication of size of a meal that may be chosen by a user;
receive at the one or more processors an input indicating that the user has chosen one of the options for a coarse indication of a size of a meal, wherein an amount of carbohydrates in the meal is unspecified to the drug delivery system and items in the meal are unknown and unspecified to the drug delivery system, and wherein the chosen option for the coarse size of the meal indicates that the meal is categorized as a meal of a first size or a meal of a second size;
responsive to where the meal is categorized as a meal of the first size, determine with the one or more processors a first updated setting for a delivery constraint to a first preset percentage above a current maximum amount of the drug permitted to be delivered as specified by the delivery constraint, wherein the delivery constraint constrains an amount of the drug that is permitted to be delivered by the drug delivery device in a time period;
where the meal is categorized as a meal of the second size, determine with the one or more processors a second updated setting for the delivery constraint to a second preset percentage above a current maximum amount of the drug permitted to be delivered as specified by the delivery constraint;
determine with the one or more processors a dose of the drug to be delivered in response to the chosen option for the coarse indication of the size of the meal subject to the determined delivery constraint; and
with the one or more processors, cause the determined dose of the drug to be delivered from the reservoir.

2. The non-transitory computer readable of claim 1, wherein the one or more processors when executing the programming code is/are operable to:
receive an indication of a relative time of ingestion of the meal; and
determine a setting for a delay parameter based on the received indication of a relative time of ingestion of the meal.

3. The non-transitory computer readable medium of claim 2, wherein the one or more processors when executing the programming code is/are operable to perform further functions, including functions to:
receive blood glucose measurement values over a period of time extending from before until after receipt of the indication of the relative time of ingestion of the meal;
determine a trajectory of the received blood glucose measurement values;
compare the determined trajectory to a blood glucose measurement value trajectory for a meal categorized as a fast absorbing meal;
quantify a similarity value between the determined trajectory and the blood glucose measurement value trajectory for the meal categorized as the fast absorbing meal;
compare the determined trajectory to a blood glucose measurement value trajectory for a meal categorized as a slow absorbing meal;
quantify a slow-absorbing similarity value between the determined trajectory and the slow absorbing meal blood glucose measurement value trajectory for the meal categorized as the slow absorbing meal;
based on a highest similarity value, determine the extend parameter.

4. The non-transitory computer readable of claim 1, wherein the one or more processors when executing the programming code is/are operable to:
receive an indication of a general composition of the meal which does not identify items in the meal; and
determine a setting for an extend parameter based on the received indication of then general composition of the meal.

5. The non-transitory computer readable of claim 4, wherein the one or more processors when executing the programming code is/are operable to perform further functions, including functions, when receiving the input indicating the setting for the extend parameter, to:
receive blood glucose measurement values over a period of time extending from before until after receipt of the relative time of ingestion of the meal;
determine a trajectory of the received blood glucose measurement values;
compare the determined trajectory to known blood glucose measurement value trajectories related to meals of different compositions;
based on a result of the comparison, determine the general meal composition indication was accurate;
confirm that the received input indicating the setting for the extend parameter is correct; and
based on the confirmation, utilize the received input in the determination of the extend parameter.

6. The non-transitory computer readable of claim 1, wherein the one or more processors when executing the programming code is/are operable, when determining the first updated setting for the delivery constraint, to perform further functions, including functions to:
set the delivery constraint to a numeric value.

7. The non-transitory computer readable of claim 1, wherein the one or more processors when executing the programming code is/are operable to perform further functions, including functions to:
determine factors usable in limiting a number of meal models for selection from a plurality of meal models, wherein the factors include a time of day, calendar setting for a day in which the meal is being ingested, a closest match to a meal profile trajectory, or user inputs;
identify meal models from the plurality of meal models that satisfy a greatest number of factors;
eliminate all meal models from the plurality of meal models except for the identified meal models; and
choose one of the identified meal models for selection based on a confidence level associated with each of the identified meal models and use the selected meal model in determining the dose of the drug to be delivered.

8. A drug delivery system, comprising:
a reservoir for storing a drug;
one or more processors;
one or more memories storing programming code, an artificial pancreas application, and operable to store data related to the artificial pancreas application, wherein the programming code and the artificial pancreas application are executable by the processor; and
wherein the one or more processors when executing the artificial pancreas application is/are operable to control delivery of the drug, and to perform functions, including functions to:
display on a display device a plurality of options for a coarse indication of size of a meal that may be chosen by a user;
receive an input indicating that the user has chosen one of the options for a coarse indication of a size of a meal, wherein an amount of carbohydrates in the meal is unspecified to the drug delivery system and items in the meal are unknown and unspecified to the drug delivery system, and wherein the chosen option for the coarse size of the meal indicates that the meal is categorized as a meal of a first size or a meal of a second size;

responsive to where the meal is categorized as a meal of the first size, determine with the one or more processors a first updated setting for a delivery constraint to a first preset percentage above a current maximum amount of the drug permitted to be delivered as specified by the delivery constraint, wherein the delivery constraint constrains an amount of the drug that is permitted to be delivered by the drug delivery device in a time period;

responsive to where the meal is categorized as a meal of the second size, determine with the one or more processors a second updated setting for the delivery constraint to a second preset percentage above the current maximum amount of the drug permitted to be delivered as specified by the delivery constraint;

determine a dose of the drug to be delivered in response to the chosen option for the coarse indication of the size of the meal subject to the delivery constraint; and cause the determined dose of the drug to be delivered from the reservoir.

9. The drug delivery system of claim 8, further comprising:

a transceiver operable to receive signals from and transmit signals to a blood glucose sensor, wherein the transceiver is operable to:

receive a plurality of blood glucose measurement values, wherein respective blood glucose measurement values are received at respective predetermined time intervals; and provide the measured blood glucose values to the processor and the artificial pancreas application.

10. The drug delivery system of claim 8, wherein the one or more processors when executing the programming code is/are operable to:

receive an indication of a relative time of ingestion of the meal; and determine a setting for a delay parameter based on the received indication of a relative time of ingestion of the meal.

11. The drug delivery system of claim 8, wherein the one or more processors when executing the programming code is/are operable to:

receive an indication of a general composition of the meal which does not identify items in the meal; and determine a setting for an extend parameter based on the received indication of then general composition of the meal.

12. The drug delivery system of claim 11, wherein the one or more processors when executing the programming code is/are operable to perform further functions, including functions, when receiving the input indicating the setting for the extend parameter, to:

receive blood glucose measurement values over a period of time extending from before until after the receipt of the relative time of ingestion of the meal;

determine a trajectory of the received blood glucose measurement values;

compare the determined trajectory to known blood glucose measurement value trajectories related to meals of different compositions;

based on a result of the comparison, determine the general meal composition indication was accurate;

confirm that the received input indicating the setting for the extend parameter is correct; and based on the confirmation, utilize the received input in the determination of the extend parameter.

13. The drug delivery system of claim 8, wherein the one or more processors when executing the programming code is/are operable to perform further functions, including functions to:

determine factors usable in limiting a number of meal models for selection from a plurality of meal models, wherein the factors for limiting the number of meal models for selection include a time of day, calendar setting for a day in which the meal is being ingested, a closest match to a meal profile trajectory, or user inputs;

identify meal models from the plurality of meal models that satisfy a greatest number of factors;

eliminate all meal models from the plurality of meal models except for the identified meal models; and choose one of the identified meal models for selection based on a confidence level associated with each of the identified meal models and use the selected meal model in determining the dose of the drug to be delivered.

* * * * *